(12) United States Patent
Suryanarayana et al.

(10) Patent No.: US 11,615,121 B1
(45) Date of Patent: Mar. 28, 2023

(54) HYBRID RUNTIME DATA OBJECT PREVENTING INTERMINGLING OF DATA OF DIFFERENT ENTITIES IN A MULTI-TENANT ENVIRONMENT

(71) Applicant: People Center, Inc., San Francisco, CA (US)

(72) Inventors: Sachin Aralasurali Suryanarayana, Karnataka (IN); Shubham Choudhary, Karnataka (IN); Kevinkumar Amipara, Gujarat (IN); Neelesh Lohani, Uttarakhand (IN); Sanket Singhal, Jharkhand (IN)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/687,240

(22) Filed: Mar. 4, 2022

(30) Foreign Application Priority Data

Dec. 1, 2021 (IN) .............................. 202121055692

(51) Int. Cl.
| G06F 16/00 | (2019.01) |
| G06F 16/28 | (2019.01) |
| G06F 16/248 | (2019.01) |
| G06F 16/23 | (2019.01) |

(52) U.S. Cl.
CPC ........ *G06F 16/285* (2019.01); *G06F 16/2358* (2019.01); *G06F 16/2365* (2019.01); *G06F 16/248* (2019.01)

(58) Field of Classification Search
CPC .............. G06F 16/285; G06F 16/2358; G06F 16/2365; G06F 16/248

USPC ................................................ 707/600–899
See application file for complete search history.

(56) References Cited

U.S. PATENT DOCUMENTS

| 9,633,076 | B1* | 4/2017 | Morton ............... G06F 16/9535 |
| 10,169,465 | B2* | 1/2019 | Andrews ............... G06F 16/951 |
| 2007/0174322 | A1* | 7/2007 | Simison ............... G06F 16/211 |
| | | | 707/999.102 |
| 2008/0005197 | A1* | 1/2008 | Chang ..................... G06F 16/84 |
| 2009/0063555 | A1* | 3/2009 | Fisher ................... G06F 16/284 |
| 2013/0031141 | A1* | 1/2013 | Tobin ................... G06F 16/242 |
| | | | 707/802 |
| 2017/0060537 | A1* | 3/2017 | Mack ....................... G06F 8/10 |
| 2017/0286388 | A1* | 10/2017 | Tamilarasan .......... G06F 3/0482 |

* cited by examiner

*Primary Examiner* — Michelle N Owyang
(74) *Attorney, Agent, or Firm* — Dority & Manning, P.A.

(57) ABSTRACT

Methods, systems, devices, and tangible non-transitory computer readable media facilitating runtime reporting across multiple entities using a multi-tenant database including data of the multiple entities without intermingling the data. In an example embodiment, at a reporting runtime, the disclosed technology can: execute a hybrid class to generate a hybrid runtime data object that can include location-specific reporting data that can correspond to multiple entities and multiple reporting locations; evaluate, with respect to a certain reporting location, a mapping file of the hybrid class to determine whether to retrieve a reporting value of a reporting data field from a first data object corresponding to a first entity or from a second data object corresponding to a second entity; and/or access the first data object or the second data object to retrieve the reporting value based at least in part on evaluation of the mapping file.

20 Claims, 14 Drawing Sheets

HYBRID RUNTIME DATA OBJECT PREVENTING INTERMINGLING OF DATA OF DIFFERENT ENTITIES IN A MULTI-TENANT ENVIRONMENT

PRIORITY CLAIM

The present application is based on and claims priority to Indian Provisional Patent Application No. 202121055692, having a filing date of Dec. 1, 2021, which is incorporated by reference herein.

FIELD

The present disclosure relates generally to the runtime management of data of different entities in a multi-tenant environment. More particularly, the present disclosure relates to a hybrid runtime data object that can prevent intermingling of data of different entities stored in a multi-tenant database including, for example, when generating reports.

BACKGROUND

Some existing data management systems utilize a multi-tenant database that can be generated and/or maintained by a single host entity (e.g., a professional employer organization (PEO)) that is responsible for managing and applying the data of different client entities (e.g., client organizations of the PEO), as well as data of the host entity, where all such data is stored in the multi-tenant database of the host entity. A problem with such a data management system is that inadvertent intermingling of the data in the multi-tenant database can occur when performing certain operations associated with the host entity and/or the different client entities (e.g., operations completed during generation of a report), which can cause data security and/or modeling problems.

SUMMARY

Aspects and advantages of embodiments of the present disclosure will be set forth in part in the following description, or can be learned from the description, or can be learned through practice of the embodiments.

According to an example embodiment of the present disclosure, a computing system can include one or more processors. The computing system can further include one or more memory devices that can store instructions that, when executed by the one or more processors, can cause the computing system to perform operations. The operations can include maintaining multiple sets of data objects that can respectively correspond to multiple entities and multiple reporting locations. The multiple sets of data objects can respectively include one or more values that can correspond to one or more data fields. The operations can further include executing, at a reporting runtime, a hybrid class to generate a hybrid runtime data object that can include location-specific reporting data that can correspond to the multiple entities and the multiple reporting locations. The operations can further include generating a report based at least in part on the hybrid runtime data object. The operations can further include outputting the report. The executing, at the reporting runtime, the hybrid class to generate the hybrid runtime data object can include evaluating, with respect to at least one reporting location, a mapping file of the hybrid class to determine whether to retrieve at least one reporting value of at least one reporting data field from a first data object that can correspond to a first entity or from a second data object that can correspond to a second entity. The executing, at the reporting runtime, the hybrid class to generate the hybrid runtime data object can further include accessing the first data object or the second data object to retrieve the at least one reporting value based at least in part on evaluation of the mapping file.

According to another example embodiment of the present disclosure, a computer-implemented method to perform reporting across multiple entities without intermingling data of the multiple entities can include maintaining, by a computing system that can include one or more processors, multiple sets of data objects that can respectively correspond to multiple entities and multiple reporting locations. The multiple sets of data objects can respectively include one or more values that can correspond to one or more data fields. The computer-implemented method can further include executing, by the computing system, at a reporting runtime, a hybrid class to generate a hybrid runtime data object that can include location-specific reporting data that can correspond to the multiple entities and the multiple reporting locations. The computer-implemented method can further include generating, by the computing system, a report based at least in part on the hybrid runtime data object. The computer-implemented method can further include outputting, by the computing system, the report. The executing, by the computing system, at the reporting runtime, the hybrid class to generate the hybrid runtime data object can include evaluating, by the computing system, with respect to at least one reporting location, a mapping file of the hybrid class to determine whether to retrieve at least one reporting value of at least one reporting data field from a first data object that can correspond to a first entity or from a second data object that can correspond to a second entity. The executing, by the computing system, at the reporting runtime, the hybrid class to generate the hybrid runtime data object can further include accessing, by the computing system, the first data object or the second data object to retrieve the at least one reporting value based at least in part on evaluation of the mapping file.

According to yet another example embodiment of the present disclosure, one or more tangible non-transitory computer-readable media can store computer-readable instructions that when executed by one or more processors can cause the one or more processors to perform operations. The operations can include maintaining multiple sets of data objects that can respectively correspond to multiple entities and multiple reporting locations. The multiple sets of data objects can respectively include one or more values that can correspond to one or more data fields. The operations can further include executing, at a reporting runtime, a hybrid class to generate a hybrid runtime data object that can include location-specific reporting data that can correspond to the multiple entities and the multiple reporting locations. The operations can further include generating a report based at least in part on the hybrid runtime data object. The operations can further include outputting the report. The executing, at the reporting runtime, the hybrid class to generate the hybrid runtime data object can include evaluating, with respect to at least one reporting location, a mapping file of the hybrid class to determine whether to retrieve at least one reporting value of at least one reporting data field from a first data object that can correspond to a first entity or from a second data object that can correspond to a second entity. The executing, at the reporting runtime, the hybrid class to generate the hybrid runtime data object can further include accessing the first data object or the second data object to retrieve the at least one reporting value based at least in part on evaluation of the mapping file.

Other embodiments of the present disclosure are directed to various systems, apparatuses, non-transitory computer-readable media, computer-implemented methods, user interfaces, and/or devices that can facilitate runtime reporting across multiple entities using a multi-tenant database including data of the multiple entities without intermingling the data.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
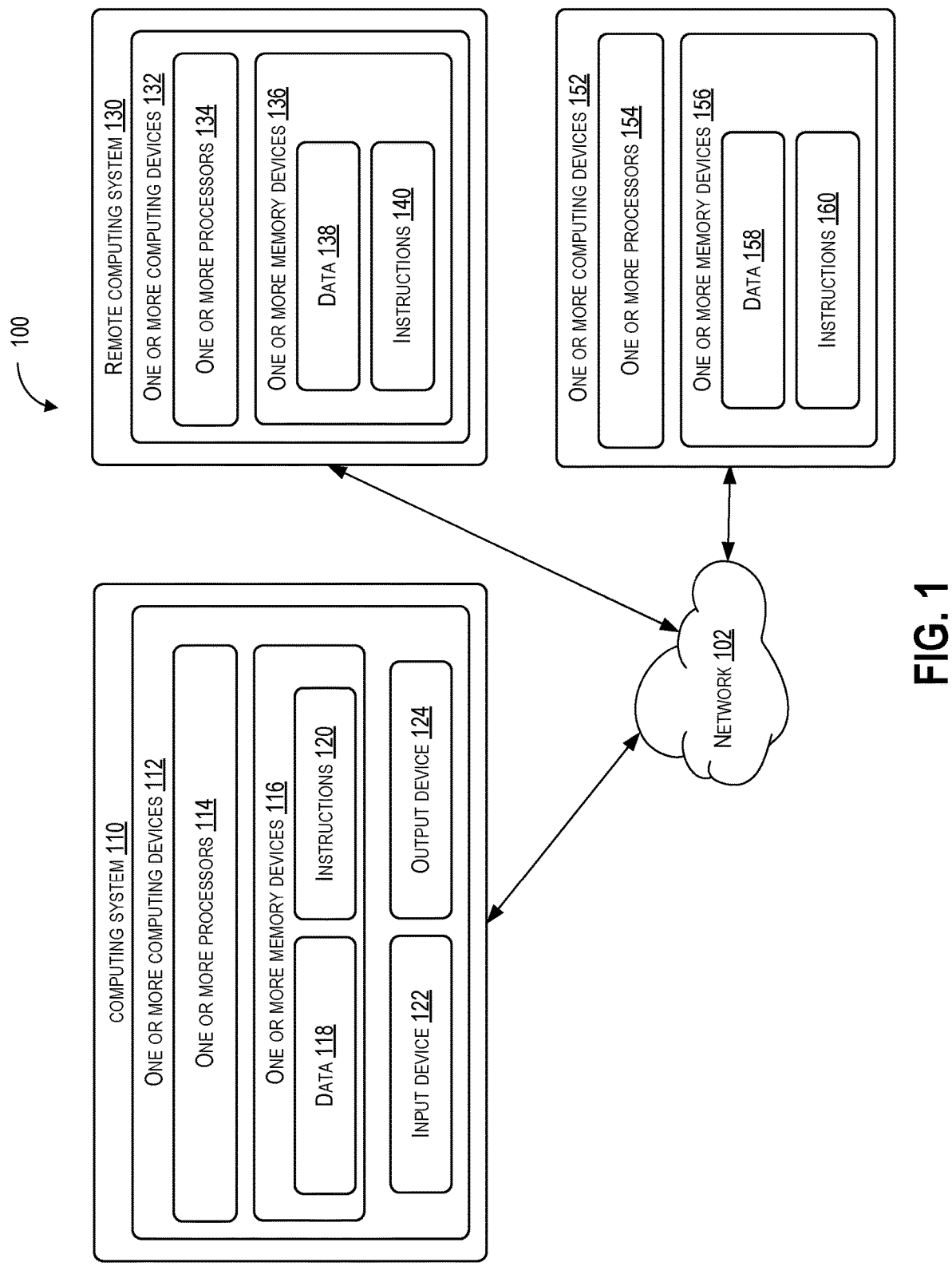
FIG. 1 depicts a block diagram of an example environment including a computing system that performs operations according to example embodiments of the present disclosure.

Reference numerals that are repeated across plural figures are intended to identify the same features in various implementations.

DETAILED DESCRIPTION

The present disclosure is generally directed to the generation of one or more reports at runtime (also referred to herein as "runtime reporting" and/or "reporting runtime"). More specifically, the present disclosure is directed to an organizational management platform that can facilitate runtime reporting across multiple entities without intermingling data (e.g., organizational data) of the multiple entities in accordance with at least one embodiment described herein. For instance, an organizational management platform according to one or more embodiments of the present disclosure can generate and/or maintain a single, centralized database (e.g., a multi-tenant database) that can include a plurality of data models (e.g., data graphs) that can respectively correspond to different entities. In these one or more embodiments, the organizational management platform can further employ and/or access such data models that can be stored in such a centralized database to facilitate runtime reporting associated with at least one of the different entities without intermingling the data of the different entities.

In some implementations, the generated reports can relate to one or more professional employer organizations (PEO). In particular, in some implementations, the multiple entities for which reports can be generated can include a PEO and one or more client organizations (e.g., corporations) that share or otherwise have employees that are employed by or members of the PRO.

To generate one or more PEO reports at runtime without intermingling the data of different entities that can be stored in a centralized database (e.g., a multi-tenant database), an organizational management platform according to one or more embodiments of the present disclosure can generate and/or maintain multiple sets of data objects that can respectively correspond to multiple entities (e.g., a host entity and at least one client entity of the host entity) and/or multiple reporting locations (e.g., taxation reporting jurisdictions) associated with the multiple entities. In these one or more embodiments, the multiple sets of data objects can respectively include one or more values corresponding to one or more data fields. At a reporting runtime, the organizational management platform according to one or more embodiments of the present disclosure can execute a hybrid class that generates a hybrid runtime data object including location-specific reporting data (e.g., regional or jurisdiction-specific taxation reporting data) that can correspond to the multiple entities and the multiple reporting locations. In these one or more embodiments, the organizational management platform can evaluate a mapping file of the hybrid class with respect to a certain reporting location to determine whether to retrieve a reporting value of a reporting data field associated with the location-specific reporting data from a first data object corresponding to a first entity (e.g., a client entity) or from a second data object corresponding to a second entity (e.g., the host entity). In these one or more embodiments, based at least in part on such evaluation of the mapping file, the organizational management platform can access the first data object or the second data object to retrieve the reporting value, thereby preventing intermingling of data respectively corresponding to the first entity and the second entity. In some embodiments of the present disclosure, the organizational management platform can further generate a report based at least in part on the hybrid runtime data object and/or output the report (e.g., via a graphical user interface (GUI) and/or a display of a computing system (e.g., a computer) that can be associated with the organizational management platform). Thus, at runtime, a computing system can select and merge portions of separate datasets that correspond to different entities (e.g., different client entities of a PEO) so as to create a temporary runtime dataset. Reports can be generated based on the temporary runtime dataset and, subsequent to generation of the reports, the temporary runtime dataset can be deleted, e.g., so as to prevent any non-volatile intermingling of data from different entities.

In one or more embodiments of the present disclosure, the first entity can be a host entity and/or a PEO and the second entity can be a client entity of the host entity and/or a client organization of the PEO. In these one or more embodiments, the multiple sets of data objects, the first data object, the second data object, and/or one or more third data objects respectively corresponding to one or more third entities can be stored in a centralized database such as, for instance, a multi-tenant database. In these one or more embodiments, the organizational management platform can initially generate and/or maintain (e.g., in a multi-tenant database) a single set of data objects that can correspond to the first entity (e.g., the host entity and/or PEO) and the multiple reporting locations. In these one or more embodiments, the organizational management platform can subsequently generate and/or maintain (e.g., in a multi-tenant database) the above-described multiple sets of data objects that can respectively correspond to the multiple entities and the multiple reporting locations based at least in part on receipt of data indicative of the second entity (e.g., the client entity and/or client organization) joining the first entity.

According to one or more embodiments described herein, the multiple reporting locations can be multiple reporting jurisdictions, multiple taxation reporting locations, and/or multiple taxation reporting jurisdictions. In some embodiments of the present disclosure, the above-described mapping file can be an index, a list, a configuration file, and/or a look-up table that indicates, with respect to a certain reporting location, whether the reporting data field is associated with the first entity or the second entity. In some embodiments, the reporting value that can be retrieved from the first data object or the second data object can include at least one attribute of the first entity or the second entity, respectively. For example, in one or more embodiments described herein, the reporting value can include reporting account identification data (e.g., a taxation reporting account identification number) of the first entity or the second entity, where the reporting account identification data can correspond to a certain reporting location. Although example aspects of the present disclosure are described with reference to taxation reporting, the described systems and methods are equally applicable to other forms of reporting, including various types of voluntary or compulsory governmental reporting and/or regulatory reporting.

According to another aspect, the systems and methods of the present disclosure can also enable modifications to entity information which occur during an ongoing period (e.g., a month, a fiscal quarter, etc.). These modifications can be referred to as mid-period modifications. One example of such a modification is the joining or unjoining of a client entity with a host entity (e.g., a client organization joining a PEO). In some implementations, in order to enable mid-period modification and/or generation of reports subsequent to mid-period modifications, the systems described herein can maintain multiple sets of data objects that respectively correspond to multiple entities, where the multiple entities include one or more pre-modification entities and one or more post-modification entities. Stated differently, in some implementations, when a client organization joins a PEO, new data object(s) can be generated for the client organization and/or PEO which reflect the modification to the data records. Data prior to the modification can be maintained in the data objects that existed prior to the modification while data subsequent to the modification can be maintained in the data objects that were generated as a result of the modification. Then when a report is generated, the multiple data objects can be used to create multiple reports which accurately reflect the pre- and post-modification status of the data. Alternatively or additionally, one or more flags or data values (e.g., date values) can be maintained in one or more data objects to indicate a start and/or end date of the relevance of the data to a certain data object and/or entity. For example, date values can be maintained which indicate when a client organization joined a PEO and such date values can be used to bifurcate or otherwise appropriately separate data that relates pre- and post- mid-period modifications.

Aspects of the present disclosure provide numerous technical effects and benefits. For example, the organizational management platform described herein in accordance with one or more embodiments of the present disclosure can facilitate runtime reporting across multiple entities without intermingling data (e.g., organizational data) of such entities, where such data can be configured and/or formatted as discrete data models (e.g., data graphs having data objects) that can be stored in a centralized database (e.g., a multi-tenant database). For instance, at a reporting runtime involving and/or associated with a host entity (e.g., a PEO) and a client entity of the host entity (e.g., a client organization of the PEO), the organizational management platform according to one or more embodiments of the present disclosure can prevent intermingling of data and/or data models (e.g., data graphs) respectively corresponding to the host entity and the client entity when performing certain operations associated with the reporting runtime, the host entity, and/or the client entity (e.g., operations completed during a taxation reporting event). In this example, by preventing such intermingling of such data and/or data models of the host entity and the client entity, the organizational management platform according to one or more embodiments of the present disclosure can reduce and/or eliminate data security and/or modeling problems that can be associated with performing a runtime reporting across multiple entities. Thus, the security and privacy of an entity's data can be improved (e.g., which can result in a reduction in fraud, data theft, etc.).

As another example, the organizational management platform according to one or more embodiments of the present disclosure can provide for storing of multiple data graphs respectively corresponding to different entities in a single, centralized database rather than multiple databases that must be accessed by one or more processors during the above-described reporting runtime to retrieve data from the multiple data graphs. In this example, the organizational management platform according to one or more embodiments of the present disclosure can thereby facilitate at least one of improved processing efficiency, improved processing capacity, improved processing performance, and/or reduced computational costs of one or more processors that can be associated with the organizational management platform and that can execute one or more operations (e.g., retrieval of data values from one or more data graphs) in connection with the above-described reporting runtime.

In some embodiments, the organizational management platform described herein in accordance with one or more embodiments of the present disclosure can be implemented to augment and/or replace existing organizational management platforms and/or multi-tenant databases that utilize a "hub and spokes" architecture. In these embodiments, the "hub" corresponds to core features of an entity (e.g., an organization, a company, etc.) such as, accounts, entity and client information, onboarding and/or offboarding flows, and/or another feature, while the "spokes" correspond to individual services of the entity such as, payroll, benefits, user provisioning in third-party applications, and/or another service. In these embodiments, the organizational management platform described herein in accordance with one or more embodiments of the present disclosure can be implemented to augment and/or replace such existing organizational management platforms and/or multi-tenant databases that utilize a "hub and spokes" architecture to provide a robust and/or scalable organizational management platform that can facilitate a reporting runtime across multiple entities associated with the organizational management platform without intermingling data of such entities. As one example, the mapping file can indicate, for each of a number of regions, whether the region is a client reporting region or a professional employer organization reporting region.

As described above, example aspects of the present disclosure are directed to the generation of PEO reports at runtime without intermingling data (e.g., organizational data) of different entities that can be stored in a centralized database such as, for instance, a multi-tenant database. Accordingly, one or more example embodiments of the present disclosure are directed to a computing system that can be used to: maintain (e.g., in a multi-tenant database) multiple sets of data objects respectively corresponding to multiple entities and multiple reporting locations, where the multiple sets of data objects respectively include one or more values corresponding to one or more data fields; execute, at a reporting runtime, a hybrid class to generate a hybrid runtime data object including location-specific reporting data corresponding to the multiple entities and the multiple reporting locations; generate a report based at least in part on the hybrid runtime data object; and/or output the report. In these one or more example embodiments, to facilitate executing, at the reporting runtime, the hybrid class to generate the hybrid runtime data object, the computing system can be further used to: evaluate, with respect to at least one reporting location, a mapping file of the hybrid class to determine whether to retrieve at least one reporting value of at least one reporting data field from a first data object corresponding to a first entity or from a second data object corresponding to a second entity; and/or to access the first data object or the second data object to retrieve the at least one reporting value based at least in part on evaluation of the mapping file. As one example, the mapping file can indicate, for each of a number of regions, whether the region is a client reporting region or a professional employer organization reporting region.

Thus, one example aspect is directed to a computing system that performs operations to perform runtime generation of PEO reports. The operations include receiving request data comprising a request for one or more reports associated with a professional employer organization. The operations include accessing, based at least in part on the request data, organizational data associated with a plurality of client entities of the professional employer organization, wherein the organizational data is stored in a multi-tenant environment in which a plurality of datasets of the organizational data that are respectively associated with the plurality of client entities are stored separately from one another. The operations include merging, during one or more runtime operations, at least a portion of each of two or more of the plurality of datasets of the organizational data that are respectively associated with the plurality of client entities into a temporary reporting dataset. The operations include generating, during the one or more runtime operations, the one or more reports associated with the professional employer organization based on the temporary reporting dataset. The operations include providing the one or more reports as an output.

Example aspects of the present disclosure are further directed to an organizational management platform that controls and leverages organizational data to enable the automatic generation of PEO reports for different users or groups of users (e.g., groups of employees of an organization) included in a set of users (e.g., all employees of an organization). In particular, an organizational management platform can control and leverage organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at runtime. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, time cards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, information technology (IT), etc. can be run through one platform and graph.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g., the "work laptops" group of the devices).

According to one example aspect, an administrator or other user of the organizational management platform can be enabled to perform operations that generate professional organization reports based on organizational data and regulatory data. In one or more embodiments of the present disclosure, the organizational management platform can constitute and/or include a computing system that can be employed (e.g., by an administrator or other user of the organizational management platform) to perform such operations to generate the professional organization reports based on organizational data and/or regulatory data. In some embodiments, when used to validate organizational records, such a computing system can be referred to as a report generation computing system.

In some implementations, the above-described computing system and/or report generation computing system (hereinafter, "computing system" or "the computing system") can include a graphical user interface that provides an easy way to view and modify fields and entries of PEO reports with a relatively low level of user foreknowledge. For example, a user can modify entries by selecting fields that are provided via the graphical user interface. In this way, the potentially complicated process of manually reviewing and validating PEO reports can be greatly facilitated.

By way of example, a computing system implementing the disclosed technology can access request data that includes a request for one or more reports associated with one or more payrolls and/or taxation data of an entity (e.g., a professional employer organization). The computing system can then access, based at least in part on the request data, organizational data associated with the entity. The organizational data can include information associated with a plurality of entities including the entity, the one or more payrolls and/or taxation data of the entity, and/or one or more regions associated with the entity. Further, the organizational data can be stored in a multi-tenant environment in which a plurality of datasets of the organizational data that are respectively associated with the plurality of client entities are stored separately from one another. The computing system can access, based at least in part on the request data associated with the entity, regulatory data (e.g., taxation reporting data) that includes regulatory information for the one or more regions associated with the entity. Furthermore, the computing system can generate output (e.g., a report), based at least in part on one or more runtime operations performed on the regulatory data and the organizational data associated with the entity. The output can include one or more PEO reports associated with the entity.

Accordingly, the disclosed technology may improve the effectiveness with which PEO reports are generated. In particular, the disclosed technology can generate PEO reports in a manner that safeguards the privacy of entities that store organizational data in a multi-tenant environment.

The computing system can receive, access, obtain, and/or retrieve data which can include request data. The request data can include one or more requests (e.g., a request) for one or more reports that can be associated with one or more payrolls and/or taxation data of an entity. For example, the computing system can receive request data including a request from a user (e.g., an authorized user) for a report on the estimated taxes for the current quarter (e.g., a three-month period including the current day).

The request data can include one or more names of an entity (e.g., a registered business name of an entity, a "doing business as" name of an entity) in one or more regions (e.g., one or more geographic regions) and/or an entity identifier (e.g., a unique number or set of numbers that can be used to access organizational data associated with the entity). Further, the request data can include information that can be used to access organizational data associated with the entity including a location (e.g., physical location and/or logical location) of the organizational data for the entity. For example, the request data can be used to access an entity's organizational data that is stored in a multi-tenant environment (e.g., a multi-tenant database) that includes the organizational data of other entities.

The entity can include an individual and/or an organization (e.g., a corporation). Further, the entity can be organized such that the entity is established in one or more regions. For example, the entity can have one or more names in the one or more regions (e.g., the entity can have the same name in all regions, different names in different regions, or the same name in some regions and different names in other regions).

The computing system can access data that can include organizational data that is associated with the entity. Further, accessing the organizational data can be based at least in part on the request data. For example, the computing system can use the identity of the entity that is included in the request data to access one or more portions of organizational data that are associated with the entity. The organizational data can include information associated with a plurality of entities including the entity, the one or more payrolls and/or taxation data of the entity, and/or one or more regions associated with the entity. For example, the organizational data can include the payroll information and/or taxation data for multiple organizations in different geographic regions. Further, the organizational data can be stored in a multi-tenant environment in which a plurality of datasets of the organizational data are respectively associated with the plurality of entities and are stored separately from one another. For example, the organizational data can be stored in a single, multi-tenant database and/or in a set of multi-tenant databases that include the organizational data for different entities.

In some embodiments, the plurality of entities can include a plurality of organizations. For example, each of the plurality of entities can be an organization (e.g., a business) that operates in at least one country or sub-region (e.g., state or province) of a country. Further, the organizational data for each of the plurality of entities can be segregated from organizational data of other entities of the plurality of entities. For example, the organizational data for each entity can be stored in a discrete data model (e.g., data graph) and/or in a separate partition of a database that maintains the organizational data. Further, each data model and/or separate partition of the database can be configured to be accessible only to the entity that is associated with that data model and/or partition (e.g., access to each data model and/or partition can be based on a passcode that is provided to the respective entity).

In some embodiments, the plurality of entities can be respectively associated with a plurality of shards of the organizational data. For example, the organizational data can include a plurality of database tables and each of the plurality of entities can be horizontally partitioned so that each entity is associated with a separate database table.

By way of example, the computing system can access organizational data that is stored locally and/or on one or more remote computing systems and/or one or more remote computing devices. Further, the organizational data can be under the control of the entity (e.g., the entity has access to the organizational data and the ability to modify and/or delete one or more portions of the organizational data).

The computing system can access data including regulatory data. Accessing the regulatory data can be based at least in part on the request data and/or the organizational data associated with the entity. The regulatory data can include regulatory information and/or data for the one or more regions associated with the entity. Regulatory information can include information and/or data associated with one or more regulations, one or more laws, one or more rules, one or more practices, one or more standards, and/or one or more principles (e.g., standard accounting principles).

For example, the regulatory information can include one or more taxation codes for one or more regions. Further, the regulatory information can include information that is applicable to the entity as an individual organization and/or as part of a PEO. By way of further example, the request data can include information associated with the region (e.g., country, state, city, jurisdiction, etc.) for which regulatory data will be accessed. If the request includes a request for a report on the entity's payroll and/or taxation data in the state of Illinois in the United States of America, the computing system will access the regulatory data including state regulatory data associated with the state of Illinois and/or federal regulatory data associated with the United States.

The computing system can generate output. Generation of the output can be based at least in part on one or more runtime operations performed on the regulatory data and/or the organizational data associated with the entity. The output can include one or more reports associated with the entity. For example, the one or more reports can include one or more PEO reports that indicate the estimated amount of taxation that an entity (e.g., the PEO or a client entity of the PEO) should pay in a particular region. The one or more reports can be configured and/or formatted in accordance with one or more templates and can be used to fulfill one or more regulatory and/or reporting requirements (e.g., legal requirements for reporting financial information (revenue and/or income) for an entity). Further, the one or more reports can include information and/or data associated with the entity's payrolls, benefits (e.g., healthcare benefits) provided to employees of the entity in different regions, and/or retirement savings plans of employees of the entity.

Furthermore, the one or more reports can include data and/or information associated with one or more names of employees of the organization, one or more names of contractors that perform work for the organization, one or more identifiers that can be used to uniquely identify any employee of the entity, and/or any third-party that is associated with the entity.

In some embodiments, the one or more reports can include one or more PEO reports. The one or more PEO reports can include information in which a PEO is indicated as the employer of record for the entity. The one or more PEO reports can include information associated with the one or more taxes of the entity that should be paid in one or more regions and/or one or more benefits that are due to be paid to one or more employees of the entity (e.g., employees of an entity organization). The one or more PEO reports can be based at least in part on the one or more payrolls of the entity (e.g., a portion of the one or more taxes of the entity are based on the incomes of the employees associated with the one or more payrolls).

In some embodiments, the one or more regions can be associated with one or more sets of regulations. For example, a region can include a federal taxation region of a country and can be associated with the one or more taxation codes for that federal taxation region. By way of further example, the region can include a plurality of sub-regions (e.g., states, cities, or provinces) of a country and each of the plurality of sub-regions can include a respective set of regulations (e.g., a taxation code for a state, a city, or a province).

The computing system can determine whether, when, and/or if the one or more runtime operations have been completed. For example, the computing system can monitor the one or more runtime operations and determine when the last runtime operation has been completed.

Further, in response to determining that the one or more runtime operations have been completed, the computing system can delete any data generated during the one or more runtime operations. For example, the one or more runtime operations can include the generation of data and/or information that is stored on one or more storage devices and/or one or more memory devices. After determining that the one or more runtime operations have been completed, the computing system can delete the data and/or information that is stored on the one or more storage devices and/or the one or more memory devices. In this way, confidential and/or private information of the entity will not be available on the devices that were used to generate the one or more reports.

In some embodiments, the one or more runtime operations can be performed using one or more volatile memory devices. For example, the one or more runtime operations can store data and/or one or more instructions on RAM (random access memory) to which power is interrupted after completion of the one or more runtime operations, thereby resulting in loss of the stored data and/or one or more instructions.

In some embodiments, the one or more runtime operations can be performed iteratively over one or more iterations. For example, the one or more iterations can be associated with the one or more geographic areas (e.g., one iteration per geographic area), the one or more payrolls (e.g., one iteration per payroll), a time interval (e.g., one iteration per year of payrolls), and/or one or more types of information (e.g., one iteration per employee benefit). Further, the one or more runtime operations can include validation of the one or more reports after each of the one or more iterations. For example, the computing system can determine whether a total number of employees of the entity matches a total number of employee payrolls of the entity. Further, the computing system can perform various error checking operations (e.g., checksums) to determine whether totals and/or intermediate quantities calculated during the one or more runtime operations are correct and/or within some margin of error.

In some embodiments, validation of the one or more reports can include validation of syntax, consistency validation, and/or quantitative validation. For example, syntax validation can include checking whether the syntax used in a report are valid and does not include invalid characters (e.g., a name with a dollar ($) sign or a salary entry that includes alphabetic characters). Further, consistency validation can include determining whether a report includes consistent references to the same entity (e.g., an entity is consistently referred to as an "LLC" and not referred to as an "LLC" in one part of a report and an "LLP" in another part of the same report). Additionally, the determination of quantitative invalidity can include a determination of whether one or more values of a report exceed a predetermined maximum amount or are less than a predetermined minimum amount. For example, a report that indicates that an entity has a trillion (1,000,000,000,000) employees may quantitatively invalid.

In some embodiments, the one or more runtime operations are only performed after the request data is accessed and before the output is generated. For example, the one or more runtime operations can begin to be performed after the request data is accessed and can end before the output (e.g., the one or more PEO reports) is generated.

In some embodiments, generating the output can include the generation of one or more entity objects at runtime. Generation of the one or more entity objects can be based at least in part on the organizational data and/or the regulatory data. Further, the one or more entity objects can be respectively associated with the one or more regions. For example, the computing system can generate one or more data objects including one or more entity objects that are associated with the one or more payrolls and/or taxation data of the entity. Further, the one or more entity objects can be instances of one or more classes that are associated with the entity. For example, the one or more entity objects can include an entity object that is based on an organization class that includes attributes associated with names, employee numbers, and salary of employees of the organization. Each instance of the one or more entity objects can include a unique employee with an associated employee number and salary. Further, any of the one or more entity objects can include a set of one or more entity objects. For example, an entity object for a particular organizational division can include the one or more entity objects associated with only that particular organizational division.

In some embodiments, determining the one or more reports can be based at least in part on the one or more entity objects. Further, the one or more reports can be based at least in part on information and/or data from the one or more entity objects. For example, an entity object associated with the payrolls of an entity's office in the state of California can be used as the basis for a report of the California state taxes that are payable by the entity.

In some embodiments, the one or more reports can be associated with the one or more regions associated with the entity. For example, the one or more reports can include a PEO report for the entity in three regions including a federal level PEO report for the entity in a first region (e.g., a country), a second PEO report for the entity in a second region (e.g., a country that is different from the country associated with the first region), and a third PEO report for the entity in a division of the second region (e.g., a state, a city, or a jurisdiction of, for instance, the second region).

In some embodiments, the entity can include an organization and/or a division of the organization. For example, the entity can include a business organization (e.g., a for profit business or a not for profit business) that includes one or more employees that receive payment (e.g., salary) and/or benefits from the organization. Further, the entity can include divisions and/or sub-divisions that represent portions of the organization. For example, a division of an entity can include a particular department (e.g., marketing department), a geographic division of the entity (e.g., the French division, the Canadian division, etc.), a hierarchical division (e.g., the vice-presidents of an organization), or some user-selected division that satisfies some user criteria (e.g., the portion of an organization with a salary above a certain threshold amount).

In some embodiments, the organizational data can include the regulatory data. For example, a portion of the organizational data can include the regulatory data. Further, the regulatory data can be associated with one or more portions of the organizational data. For example, the regulatory data for a region can be stored in a portion of the organizational data for that geographical area.

The computing system can generate a graphical user interface that includes one or more interface elements associated with the one or more reports (e.g., one or more PEO reports). Further, the one or more interface elements can be configured to receive one or more inputs. For example, the graphical user interface can be generated on a touch sensitive (e.g., capacitive touch sensing) display output component of the computing system and can be configured to receive one or more inputs (e.g., one or more touch inputs) from the user.

Further, the computing system can receive the one or more inputs. The one or more inputs can include one or more tactile inputs (e.g., the user touching the display output component with a finger) and/or one or more aural inputs (e.g., the user speaking a command). For example, the one or more inputs can include the user tapping an interface element associated with a report in order to view the report. The user can then scroll through the report by swiping their finger on the representation of the report that is displayed on the graphical user interface.

Further, the computing system can perform one or more interface operations on the one or more reports. The one or more interface operations can be based at least in part on the one or more inputs. For example, the one or more interface operations can be used to generate a request for the one or more reports or to annotate a report (e.g., make notations regarding portions of the one or more reports that may require further review).

In some embodiments, the one or more interface operations can include deleting a report, modifying a report, and/or sending a report to one or more remote computing devices. For example, based on a user input to an interface element labelled "SAVE REPORT" an authorized user can save (e.g., store) a copy of a report on a storage device (e.g., either a local storage device or a remote storage device). Further, the user can use the one or more interface elements to modify the one or more reports based at least in part on the one or more inputs. For example, the computing system can be configured to use the one or more inputs as an input that is provided to modify the one or more reports by either adding information to the report (e.g., adding an annotation) or removing information from a report (e.g., striking through or deleting some portion of a report that may be redundant).

In some embodiments, deleting a report can include deleting one or more reports or deleting one or more portions of one or more reports. For example, a user could delete selected pages of a report or an entire report. Furthermore, sending a report to one or more remote computing devices can include sending one or more reports to a personal device (e.g., a smartphone, laptop, and/or tablet) of a user.

In some embodiments, the one or more reports can include information associated with one or more taxes payable by the entity and/or one or more employee benefits associated with the entity. For example, the one or more reports for an entity can include information associated with the amount of taxation that the entity is required to pay in a particular set of geographical locations (e.g., countries and/or subdivisions of countries such as, for instance, states and/or cities). Further, the one or more reports can include the types of employee benefits that are payable to each employee in the one or more regions. For example, certain regions may provide benefits to employees at a government level (e.g., government provided health care) while other regions may offer similar benefits as an optional benefit that may be provided by the entity (e.g., employer provided health care).

In some embodiments, the one or more runtime operations can be performed without modifying the organizational data and/or the regulatory data. For example, the one or more runtime operations can include accessing the organizational data and/or the regulatory data without writing or deleting any of the organizational data and/or regulatory data.

In some embodiments, the plurality of datasets can be encrypted and configured to be encrypted or decrypted using one of a plurality of encryption keys respectively associated with the plurality of entities. For example, a dataset can be encrypted using an encryption algorithm (e.g., Advanced Encryption Standard (AES)) that encodes the plurality of datasets and uses a two-hundred and fifty-six bit key length to decrypt the dataset or encrypt additional data that is added to the dataset.

The disclosed technology can include a computing system and/or computing device that is configured to perform various operations associated with the generation of PEO reports. In some embodiments, the computing system and/or device can be associated with various other computing systems and/or devices that use, send, receive, and/or generate information and/or data associated with the generation of PEO reports. Furthermore, the computing system and/or device can process, generate, modify, and/or access (e.g., send and/or receive) data and/or information including data and/or information associated with one or more fields respectively associated with one or more entries of one or more organizational records.

In some implementations, the disclosed computing system can be operated from a server computing system that may be accessed by a user via one or more computing devices that are connected to the server computing system. Further, the disclosed computing system can be configured to access organizational data that may be stored locally or at remote locations that are accessible via a communications network (e.g., a Local Area Network (LAN) and/or the Internet).

The computing system and/or computing device can include specialized hardware and/or software that enables the performance of one or more operations specific to the disclosed technology. Further, a computing system and/or computing device can include one or more application specific integrated circuits that are configured to perform operations associated with the generation of PEO reports.

The systems, methods, devices, apparatuses, and tangible non-transitory computer-readable media in the disclosed technology can provide a variety of technical effects and benefits including an improvement in the generation of PEO reports. In particular, the disclosed technology may assist a user (e.g., an administrator of organizational data) in performing a technical task by means of a continued and/or guided human-machine interaction process in which the user can interact with a user interface that can be used to generate and/or configure one or more PEO reports associated with payrolls and/or taxation data of an organization. Furthermore, the disclosed technology may also provide benefits including improvements in computing resource usage efficiency, security, and ease of use.

The disclosed technology can provide a variety of technical effects and benefits with respect to the efficiency of utilizing computing resource usage by increasing the accuracy associated with generating PEO reports. By generating the reports at runtime and not saving the reports in memory the amount of storage space associated with PEO reports can be reduced or eliminated. Instead of burdensome manual deletion of old reports, the disclosed technology can ensure that such reports are not stored against the user wishes.

As such, the disclosed technology may assist a user in more effectively generating a variety of PEO reports by providing the specific benefits of performing runtime operations on organizational data stored in a multi-tenant environment. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the generation of PEO reports.

With reference to the Figures, example embodiments of the present disclosure will be discussed in further detail.

FIG. 1 depicts a block diagram of an example environment including a computing system that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the Internet. Further, the network 102 can include any number of wired or wireless connections and/or links that can be used to communicate with one or more systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems and/or one or more computing devices. Further, the computing system 110 may be connected (e.g., networked) to one or more computing systems and/or one or more computing devices via the network 102. The computing system 110 may operate in various different configurations including as a server or a client machine in client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can be and/or include any processing device (e.g., a processor core, a microprocessor, an application-specific integrated circuit (ASIC), a field-programmable gate array (FPGA), a controller, or a microcontroller) and can include one processor or a plurality of processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random access memory (RAM), read only memory (ROM), erasable programmable read only memory (EPROM), electrically erasable programmable read only memory (EEPROM), one or more flash memory devices, one or more magnetic storage devices (e.g., one or more hard disk drives).

The one or more processors 114 can be configured to execute one or more instructions to perform the operations described herein including for example, one or more operations associated with validating organizational reports and generating validated reports. Further, the one or more memory devices 116 can store the data 118 and/or the instructions 120, which can be executed by the one or more processors 114 to cause the one or more computing devices 112 to perform one or more operations.

The data 118 can include organizational data (e.g., organizational data including information associated with an entity, request data including information associated with a request for one or more reports, and/or regulatory data including regulatory information as described herein). Further, the instructions 120 can include one or more instructions to use data including the data 118 to perform the one or more operations described herein. In some embodiments, the one or more memory devices 116 can be used to store one or more applications that can be operated by the one or more processors 114. The data 118, the instructions 120, and/or the one or more applications can be associated with an organization (e.g., a PEO, a client organization of a PEO, etc.). Further, the computing system 110 may be configured to manage the one or more applications. For example, the computing system 110 can perform one or more operations associated with accessing organizational data, request data, and/or regulatory data; and/or generating one or more PEO reports associated with an entity.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more user inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110 and may be configured to perform any of the operations performed by the computing system 110. Further, the remote computing system 130 can communicate with one or more devices and/or one or more systems via the network 102.

In some embodiments, the remote computing system 130 can include one or more applications (e.g., computing software applications) that can be stored and/or executed by the remote computing system 130. Further, the one or more applications can include one or more applications that may be accessed from the computing system 110 and are at least partly operated from the remote computing system 130. Further, the data 138 can include one or more portions of the organizational data.

Figure 2:
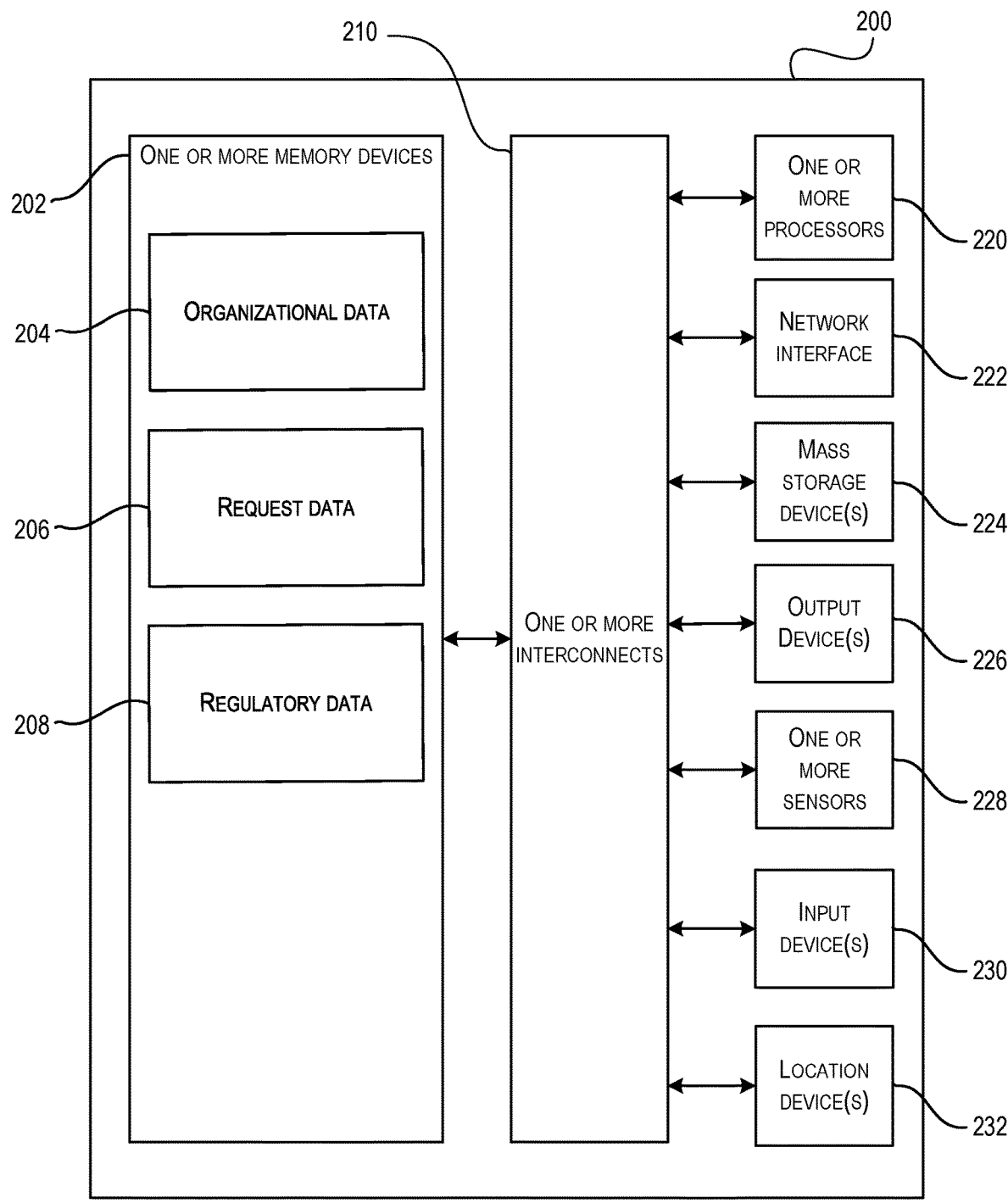
FIG. 2 depicts a block diagram of an example of a computing device according to example embodiments of the present disclosure.

FIG. 2 depicts a block diagram of an example computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 204, request data 206, regulatory data 208, one or more interconnects 210, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., the organizational data 204, the request data 206, and/or the regulatory data 208). Further, the one or more memory devices 202 can include one or more non-transitory computer-readable storage media, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations including one or more operations associated with accessing request data, accessing organizational data, accessing regulatory data, and generating output including one or more reports based on runtime operations performed on the organizational data and the regulatory data.

The organizational data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational data 204 can include information associated with a plurality of entities, payrolls of an entity, and regions associated with the entity. In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The request data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the request data 206 can include information associated with a request for one or more reports associated with one or more payrolls of an entity. In some embodiments, the request data 206 can be received from one or more computing systems (e.g., the remote computing system 130 depicted in FIG. 1) which can include one or more computing systems that are remote (e.g., in another room, building, part of town, city, or nation) from the computing device 200.

The regulatory data 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the regulatory data 208 can include information associated with regulatory information for one or more regions (e.g., country, state, city, province, etc.) associated with the entity. In some embodiments, the regulatory data 208 can be received from one or more computing systems (e.g., the remote computing system 130 depicted in FIG. 1) which can include one or more computing systems that are remote (e.g., in another room, building, part of town, city, or nation) from the computing device 200.

The one or more interconnects 210 can include one or more interconnects or buses that can be used to send and/or receive one or more signals (e.g., electronic signals) and/or data (e.g., the organizational data 204, the request data 206, and/or the regulatory data 208) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 210 can be arranged or configured in different ways. For example, the one or more interconnects 210 can be configured as parallel or serial connections. Further the one or more interconnects 210 can include: one or more internal buses that are used to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204, the request data 206, and/or the regulatory data 208. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing system 110 via the network 102.

The one or more mass storage devices 224 (e.g., a hard disk drive and/or a solid state drive) can be used to store data including the organizational data 204. The one or more output devices 226 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of a user interface that is used to access request data, access organizational data, access regulatory data, and generate output including one or more reports based on runtime operations performed on the organizational data and the regulatory data. For example, the one or more sensors 228 can be used to authenticate the identity of a user based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications that are subject to one or more security policies that can be generated and/or implemented by the computing device 200 and/or one or more other computing devices or one or more computing systems. In some embodiments, the one or more memory devices 202 can be used to operate or execute a general-purpose operating system that operates on mobile computing devices and/or stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the location device 232 can determine an actual and/or relative position of the computing device 200 by using a satellite navigation positioning system (e.g. a global positioning system (GPS), a Galileo positioning system, the GLObal Navigation satellite system (GLONASS), the BeiDou Satellite Navigation and Positioning system), an inertial navigation system, a dead reckoning system, based on an internet protocol (IP) address, by using triangulation and/or proximity to cellular towers or Wi-Fi hotspots, and/or beacons.

Figure 3:
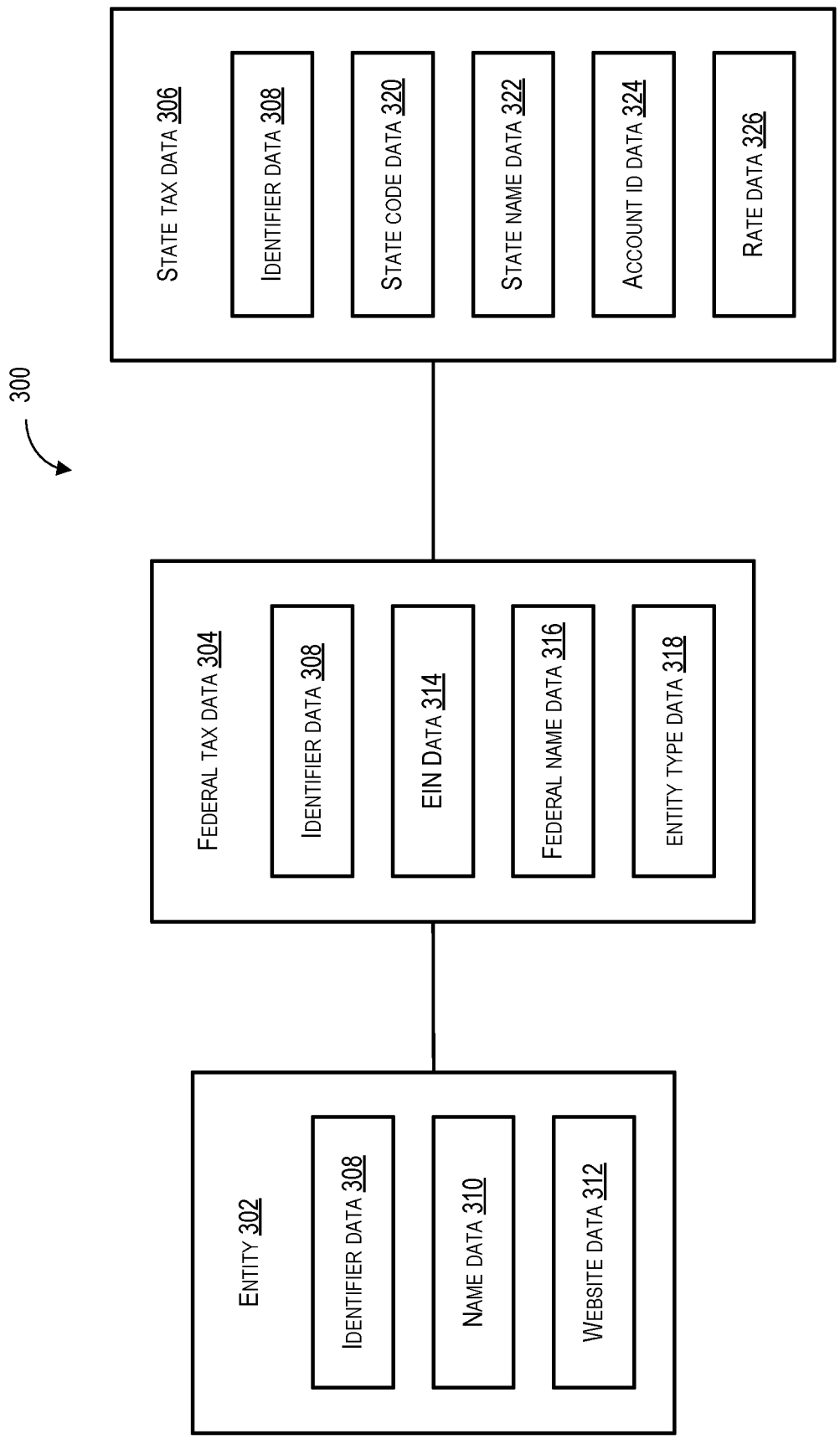
FIG. 3 depicts an example of generating professional employer organization reports at runtime according to example embodiments of the present disclosure.

FIG. 3 depicts an example of generating PEO reports at runtime according to example embodiments of the present disclosure. A computing device used to generate organizational data 300 can include one or more attributes and/or capabilities of the computing system 110, the remote computing system 130, the one or more computing devices 152, and/or the computing device 200. Furthermore, the computing device can be configured to perform one or more operations and/or one or more actions that can be performed by the computing system 110, the remote computing system 130, the one or more computing devices 152, and/or the computing device 200.

As shown in FIG. 3, the organizational data 300 includes entity data 302, federal taxation data 304, state taxation data 306, identifier data 308, name data 310, website data 312, employment identification number (EIN) data 314, federal name data 316, legal entity type data 318, state code data 320, state name data 322, account id data 324, and rate data 326.

In this example, a computing system (e.g., the computing system 110) is configured to generate output including the organizational data 300. The organizational data 300 includes one or more portions of organizational data including the entity data 302, the federal taxation data 304, and/or the state taxation data 306. The entity data 302 can include information associated with an entity (e.g., an organization that files and/or pays taxes); the federal taxation data 304 can include federal taxation information for the entity; and the state taxation data 306 can include state taxation information associated with the entity. The organizational data 300 can be generated and stored locally by the same computing system (e.g., the computing system 110) and/or stored remotely on another computing system (e.g., the remote computing system 130) that is at a remote location. Further, the organizational data 300 can be stored with other data including organizational data for other entities. In some embodiments, the organizational data 300 can be stored in a multi-tenant environment (e.g., a multi-tenant database) in which access to the organizational data 300 is limited to the entity and/or users authorized by the entity.

The entity data 302 can include identifier data 308 that can be used to uniquely identify the entity associated with the organizational data 300. Further, the identifier data 308 can be used to access the organizational data 300. For example, the identifier data 308 can be used to identify the organizational data associated with an entity and in particular can be used to access the organizational data of an entity that is stored with the organizational data of other entities. By way of further example, request data that is used to access the organizational data 300 can use the identifier data 308 as part of the process of receiving authorization to access the organizational data 300. The name data 310 can include the name of the entity associated with the organizational data 300. For example, the name data 310 can include a legal name of the entity (e.g., "ENTITY CORP." or "ENTITY LLC"). The name data 310 can be used on any reports that are generated using the organizational data 300. The website data 312 can include one or more addresses of one or more websites associated with the entity. In some embodiments, the one or web sites of the entity can include information associated with a web service that can be used to access the organizational data 300.

The federal taxation data 304 can include identifier data 308 that can be used to uniquely identify the entity associated with the organizational data 300. Further, the identifier data 308 in the federal taxation data 304 can be the same as the identifier data 308 that is in the entity data 302 and/or the state taxation data 306. Further, the identifier data 308 can be used to identify the organizational data associated with an entity and in particular can be used to access the federal taxation data 304 of the entity. By way of further example, request data that is used to access the organizational data 300 can use the identifier data 308 as part of the process of receiving authorization to access the organizational data 300 including the federal taxation data 304. The data 314 can include an employment identification number that can uniquely identify the entity. Further the EIN data 314 can be used in the generation of reports that include an employment identification number. The federal name data 316 can include the name of the entity that is used to represent the entity for the purpose of reports associated with a federal agency (e.g., federal taxation filings). For example, the federal name data 316 can include the registered name of the entity that is used on official documents including taxation filings. In some embodiments, the federal name data 316 can be the same as the name data 310 and/or the state name data 322. The entity type data 318 can include information associated with the type of corporate entity that is applicable to the entity. For example, the entity type data 318 can be used to determine whether the entity is an LLC or an LLP.

The state taxation data 306 can include the identifier data 308 that can be used to uniquely identify the entity associated with the organizational data 300. Further, the identifier data 308 in the state taxation data 306 can be the same as the identifier data 308 that is in the entity data 302 and/or the federal taxation data 304. Further, the identifier data 308 can be used to identify the organizational data associated with an entity and in particular can be used to access the state taxation data 306 of the entity. By way of further example, request data that is used to access the organizational data 300 can use the identifier data 308 as part of the process of receiving authorization to access the organizational data 300 including the state taxation data 306. The State code data 320 can include a state code that can be used to identify a state (e.g., "CA" for the state of California or "IL" for the state of Illinois). The organizational data 300 can include information for multiple states and the state code data 320 can be used to identify the state associated with a particular portion of the organizational data 300. The state name data 322 can include the name of the entity that is used to represent the entity for the purpose of reports associated with a state agency (e.g., state taxation filings). For example, the state name data 320 can include the registered name of the entity that is used on official documents including state taxation filings. In some embodiments, the state name data 320 can be the same as the name data 310 and/or the federal name data 316. The account ID data 324 can include a state identification number that can uniquely identify the entity. Further the account ID data 324 can be used in the generation of reports that include a state identification number. The rate data 326 can include information associated with the taxation rate and/or taxation schedule that is associated with the entity.

Figure 4:
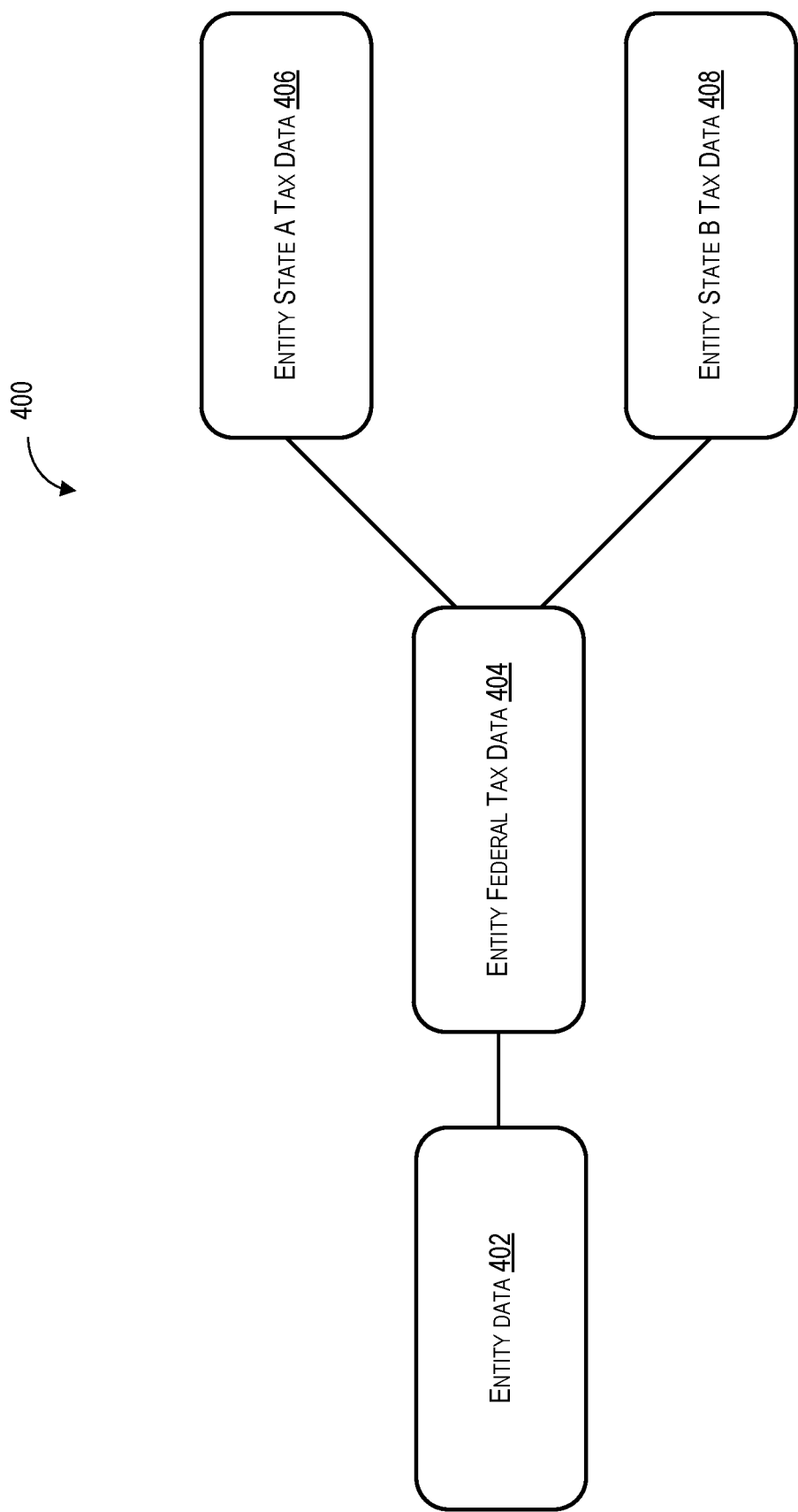
FIG. 4 depicts an example of generating professional employer organization reports at runtime according to example embodiments of the present disclosure.

FIG. 4 depicts an example of generating PEO reports at runtime according to example embodiments of the present disclosure. A computing device used to generate organizational data 400 can include one or more attributes and/or capabilities of the computing system 110, the remote computing system 130, the one or more computing devices 152, and/or the computing device 200. Furthermore, the computing device can be configured to perform one or more operations and/or one or more actions that can be performed by the computing system 110, the remote computing system 130, the one or more computing devices 152, and/or the computing device 200.

As shown in FIG. 4, the organizational data 400 includes entity data 402, entity federal taxation data 404, entity state A tax data 406, and entity state B tax data 408.

In this example, a computing system (e.g., the computing system 110) is configured to generate output including the organizational data 400. The organizational data 400 includes one or more portions of organizational data including the entity data 402, the entity federal taxation data 404, the entity state A tax data 406, and/or the entity state B tax data 408. The entity data 402 can include information associated with an entity (e.g., an organization that files and/or pays taxes); the entity federal taxation data 404 can include federal taxation information for the entity; the entity state A tax data 406 can include information associated with the benefits provided by the entity to the entity's employees in a first state (e.g., health care benefits provided to employees in the state of California); and the entity state B tax data 408 can include information associated with the benefits provided by the entity to the entity's employees in a second state (e.g., health care benefits provided to employees in the state of Illinois). The organizational data 400 can be generated and stored locally by the same computing system (e.g., the computing system 110) and/or stored remotely on another computing system (e.g., the remote computing system 130) that is at a remote location. Further, the organizational data 400 can be stored with other data including organizational data for other entities. In some embodiments, the organizational data 400 can be stored in a multi-tenant environment (e.g., a multi-tenant database) in which access to the organizational data 400 is limited to the entity and/or users authorized by the entity.

The entity data 402 can include information about the entity including the entity name (e.g., legal name of the entity), entity identifier (e.g., the identifier data 308 depicted in FIG. 3), taxation reporting for the entity, one or more payrolls of the entity including wage information for employees of the entity, and/or entity legal status (e.g., whether the entity is an LLC or an LLP). The entity data 302 and/or the entity data 402 can be used to determine the entity federal taxation data 404.

The entity federal taxation data 404 can include information associated with federal taxation that is estimated to be payable and/or that was previously paid by the entity. The entity federal taxation data 404 includes information associated with entity taxes including taxation schedules, taxation rates, and/or past taxation filings. The entity federal taxation data 404 can be based at least in part on the entity data 302 and/or the entity data 402. For example, the entity's revenues and/or payrolls can provide a basis from which one or more taxes of the entity are calculated.

The entity state A tax data 406 can include information associated with state taxation that is estimated to be payable and/or that was previously paid by the entity in a particular state (e.g., the state of California). The entity state A tax data 406 includes information associated with entity taxes including taxation schedules, taxation rates, and/or past taxation filings in a particular state. The entity state A tax data 406 can be based at least in part on the entity data 302 and/or the entity data 402. For example, the entity's revenues and/or payrolls can provide a basis from which one or more taxes of the entity are calculated. Further, the entity state A tax data 406 can use information from the entity federal taxation data 404 to determine one or more benefits and/or taxes that are due in a state. For example, certain information including the entity data 402 (e.g., the name of the entity and/or the annual revenue of the entity) can be used to determine the entity state A tax data 406.

The entity state B tax data 408 can include information associated with state taxation that is estimated to be payable and/or that was previously paid by the entity in a particular state (e.g., the state of Illinois) that is different from the first state of the entity first state data 406. The entity first state tax data 408 can include information associated with entity taxes including taxation schedules, taxation rates, and/or past taxation filings in a particular state. The entity state B tax data 408 can be based at least in part on the entity data 302 and/or the entity data 402. For example, the entity's revenues and/or payrolls can provide a basis from which one or more taxes of the entity are calculated. Further, the entity state B tax data 408 can use information from the entity federal taxation data 404 to determine one or more benefits and/or taxes that are due in a state. For example, certain information including the entity data 402 (e.g., the name of the entity and/or the annual revenue of the entity) can be used to determine the entity state B tax data 408.

A computing system (e.g., the computing system 110) can generate one or more professional organization reports based at least in part on a combination of PEO data and the organizational data 400. For example, a PEO can use the organizational data 400 as the basis for a taxation filing that includes the organizational data 400 as one of a plurality of entities (e.g., organizations) that each have respective sets of organizational data.

Figure 5:
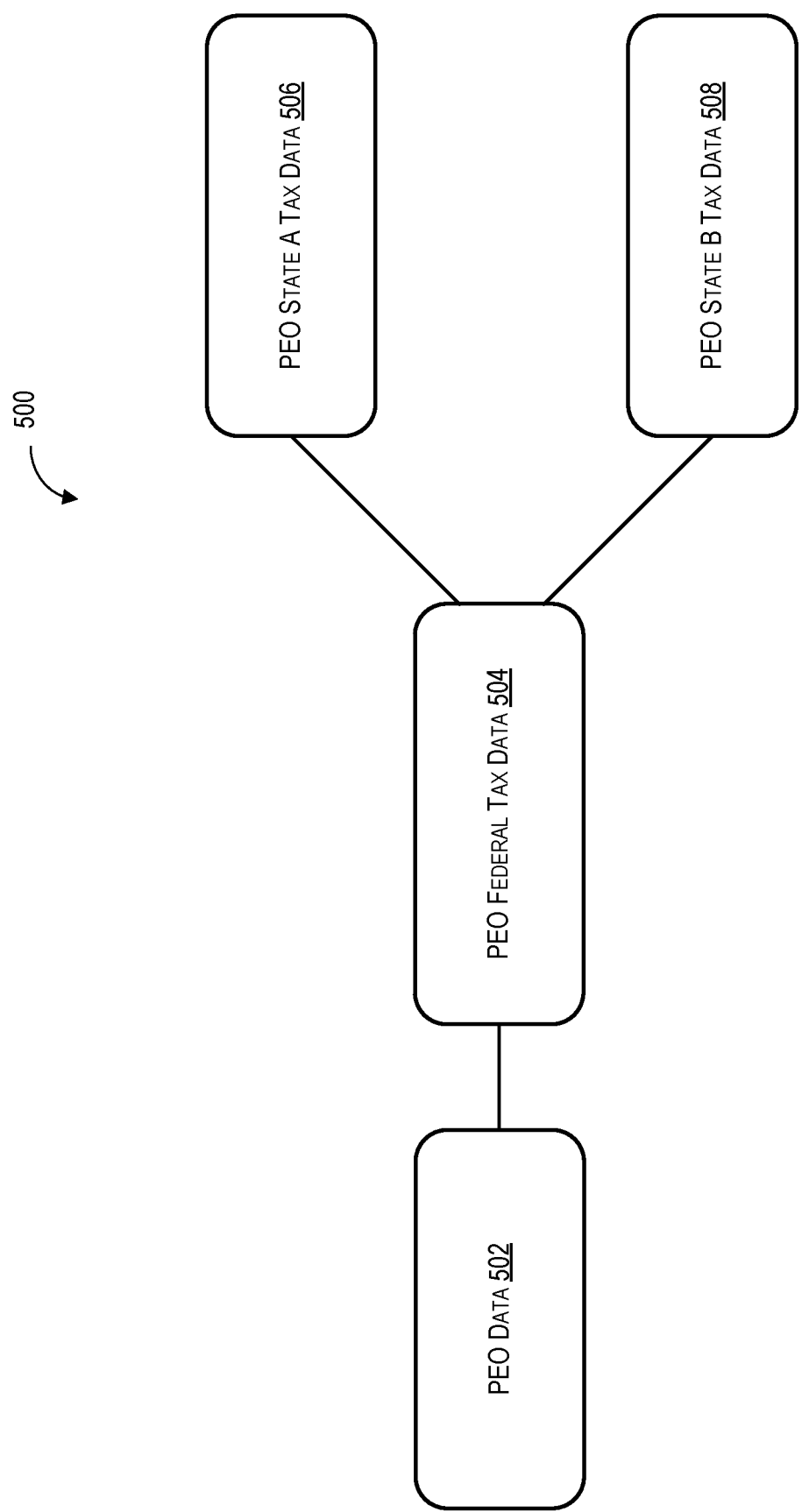
FIG. 5 depicts an example of generating professional employer organization reports at runtime according to example embodiments of the present disclosure.

FIG. 5 depicts an example of generating PEO reports at runtime according to example embodiments of the present disclosure. A computing device used to generate organizational data 500 can include one or more attributes and/or capabilities of the computing system 110, the remote computing system 130, the one or more computing devices 152, and/or the computing device 200. Furthermore, the computing device can be configured to perform one or more operations and/or one or more actions that can be performed by the computing system 110, the remote computing system 130, the one or more computing devices 152, and/or the computing device 200.

As shown in FIG. 5, the organizational data 500 includes PEO data 502, PEO federal taxation data 504, PEO state A tax data 506, and PEO state B tax data 508.

In this example, a computing system (e.g., the computing system 110) is configured to generate output including the organizational data 500. The organizational data 500 includes one or more portions of organizational data including the PEO data 502, the PEO federal taxation data 504, the PEO state A tax data 506, and/or the PEO state B tax data 508. The PEO data 502 can include information associated with a PEO (e.g., an organization that files and/or pays taxes); the PEO federal taxation data 504 can include federal taxation information for the PEO; the PEO state A tax data 506 can include information associated with the benefits provided by the PEO to the PEO's employees in a first state (e.g., health care benefits provided to employees in the state of California); and the PEO state B tax data 508 can include information associated with the benefits provided by the PEO to the PEO's employees in a second state (e.g., health care benefits provided to employees in the state of Illinois). The organizational data 500 can be generated and stored locally by the same computing system (e.g., the computing system 110) and/or stored remotely on another computing system (e.g., the remote computing system 130) that is at a remote location. Further, the organizational data 500 can be stored with other data including organizational data for other entities. In some embodiments, the organizational data 500 can be stored in a multi-tenant environment (e.g., a multi-tenant database) in which access to the organizational data 500 is limited to the PEO and/or users authorized by the PEO.

The PEO data 502 can include information about the PEO including the PEO name (e.g., legal name of the PEO), PEO identifier (e.g., the identifier data 308 depicted in FIG. 3), taxation reporting for the PEO, one or more payrolls of the PEO including wage information for employees of the PEO, and/or PEO legal status (e.g., whether the PEO is an LLC or an LLP). The PEO data 502 can be used to determine the PEO federal taxation data 504.

The PEO federal taxation data 504 can include information associated with federal taxation that is estimated to be payable and/or that was previously paid by the PEO. The PEO federal taxation data 504 includes information associated with PEO taxes including taxation schedules, taxation rates, and/or past taxation filings. The PEO federal taxation data 504 can be based at least in part on the PEO data 502. For example, the PEO's revenues and/or payrolls can provide a basis from which one or more taxes of the PEO are calculated.

The PEO state A tax data 506 can include information associated with state taxation that is estimated to be payable and/or that was previously paid by the PEO in a particular state (e.g., the state of California). The PEO state A tax data 506 includes information associated with PEO taxes including taxation schedules, taxation rates, and/or past taxation filings in a particular state. The PEO state A tax data 506 can be based at least in part on the PEO data 502. For example, the PEO's revenues and/or payrolls can provide a basis from which one or more taxes of the PEO are calculated. Further, the PEO state A tax data 506 can use information from the PEO federal taxation data 504 to determine one or more benefits and/or taxes that are due in a state. For example, certain information including the PEO data 502 (e.g., the name of the PEO and/or the annual revenue of the PEO) can be used to determine the PEO state A tax data 506.

The PEO state B tax data 508 can include information associated with state taxation that is estimated to be payable and/or that was previously paid by the PEO in a particular state (e.g., the state of Illinois) that is different from the first state of the PEO first state data 506. The PEO first state tax data 508 can include information associated with PEO taxes including taxation schedules, taxation rates, and/or past taxation filings in a particular state. The PEO state B tax data 508 can be based at least in part on the PEO data 502. For example, the PEO's revenues and/or payrolls can provide a basis from which one or more taxes of the PEO are calculated. Further, the PEO state B tax data 508 can use information from the PEO federal taxation data 504 to determine one or more benefits and/or taxes that are due in a state. For example, certain information including the PEO data 502 (e.g., the name of the PEO and/or the annual revenue of the PEO) can be used to determine the PEO state B tax data 508.

A computing system (e.g., the computing system 110) can generate one or more professional organization reports based at least in part on a combination of PEO data and the organizational data 500. For example, a PEO can use the organizational data 500 as the basis for a taxation filing that includes the organizational data 500 as one of a plurality of entities (e.g., organizations) that each have respective sets of organizational data.

Figure 6:
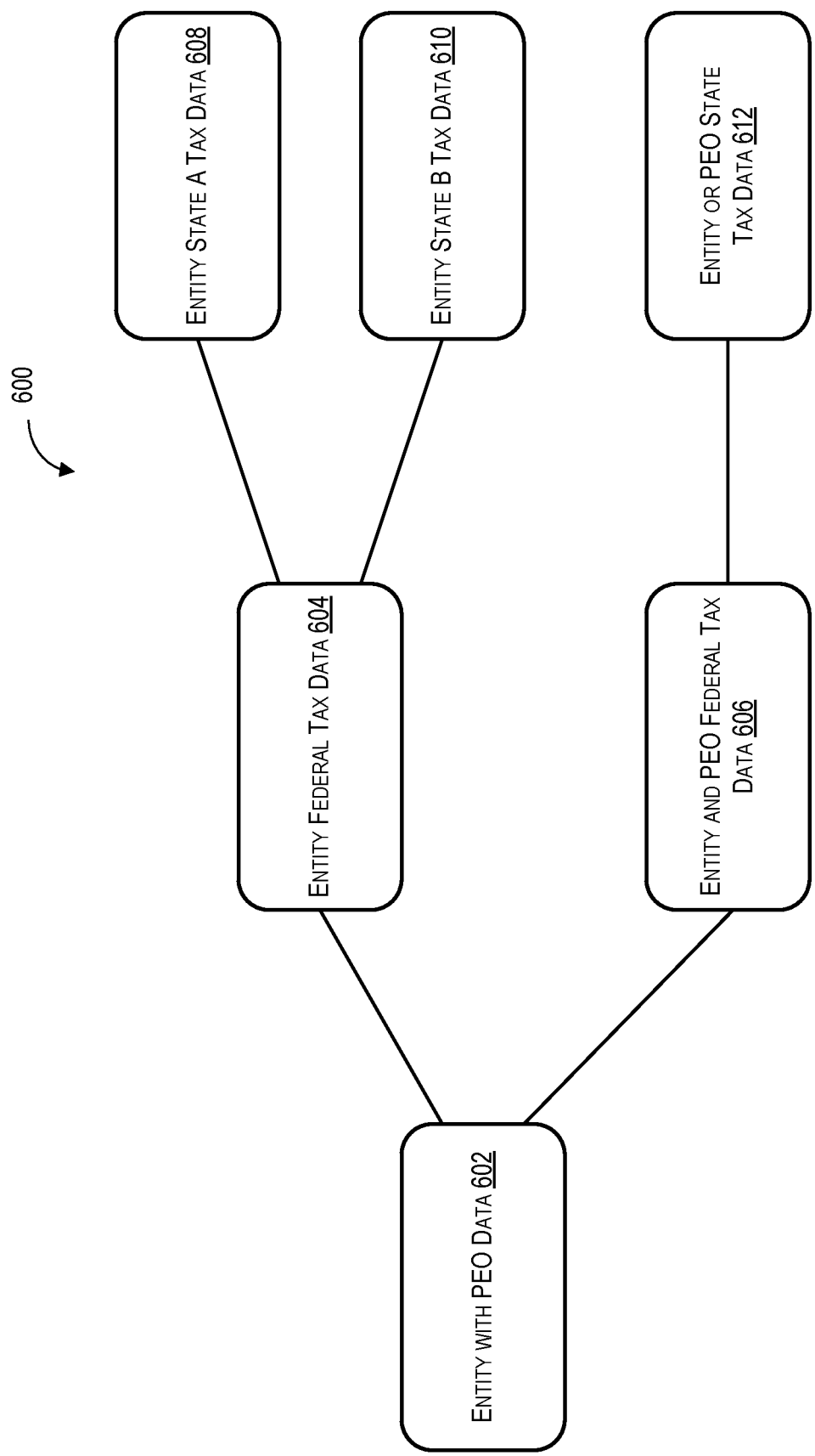
FIG. 6 depicts an example of generating professional employer organization reports at runtime according to example embodiments of the present disclosure.

FIG. 6 depicts an example of generating PEO reports at runtime according to example embodiments of the present disclosure. A computing device used to generate organizational data 600 can include one or more attributes and/or capabilities of the computing system 110, the remote computing system 130, the one or more computing devices 152, and/or the computing device 200. Furthermore, the computing device can be configured to perform one or more operations and/or one or more actions that can be performed by the computing system 110, the remote computing system 130, the one or more computing devices 152, and/or the computing device 200.

As shown in FIG. 6, the organizational data 600 includes entity with PEO data 602, entity federal taxation data 604, entity and PEO federal taxation data 606, entity state A taxation data 608, entity state B taxation data 610, and/or entity or PEO state taxation data 612.

In this example, a computing system (e.g., the computing system 110) is configured to generate output including the organizational data 600. The organizational data 600 includes one or more portions of organizational data including the entity with PEO data 602, the entity federal taxation data 604, the entity and PEO federal taxation data 606, the entity state A taxation data 608, the entity state B taxation data 610, and/or the entity or PEO state taxation data 612.

The organizational data 600 can be generated and stored locally by the same computing system (e.g., the computing system 110) and/or stored remotely on another computing system (e.g., the remote computing system 130) that is at a remote location. Further, the organizational data 600 can be stored with other data including organizational data for other entities. In some embodiments, the organizational data 600 can be stored in a multi-tenant environment (e.g., a multi-tenant database) in which access to the organizational data 600 is limited to the entity and/or users authorized by the entity.

A computing system (e.g., the computing system 110) can generate one or more professional organization reports based at least in part on a combination of entity data, PEO data, and/or the organizational data 600. For example, a PEO can use the organizational data 600 as the basis for a taxation filing that includes the organizational data 600 as one of a plurality of entities (e.g., organizations) that each have respective sets of organizational data.

The entity with PEO data 602 can include information associated with an entity (e.g., an organization that files and/or pays taxes) and/or information associated with a PEO (e.g., an organization that files and/or pays taxes), where the entity is a member and/or client organization of the PEO. The entity with PEO data 602 can include information about the entity and the PEO including, for instance: the entity name (e.g., legal name of the entity); the PEO name (e.g., legal name of the PEO); entity identifier (e.g., the identifier data 308 depicted in FIG. 3); PEO identifier (e.g., the identifier data 308 depicted in FIG. 3); taxation reporting for the entity, one or more payrolls of the entity including wage information for employees of the entity; taxation reporting for the PEO, one or more payrolls of the PEO including wage information for employees of the PEO; entity legal status (e.g., whether the entity is an LLC or an LLP); and/or PEO legal status (e.g., whether the PEO is an LLC or an LLP). The entity with PEO data 602 can be used to determine the entity and PEO federal taxation data 606.

The entity federal taxation data 604 can include federal taxation information for the entity (e.g., the entity's federal employment identification number (FEIN), federal taxes paid in the past by the entity, current federal taxes owed by the entity, etc.). The entity federal taxation data 604 can include information associated with federal taxation that is estimated to be payable and/or that was previously paid by the entity. The entity federal taxation data 604 can include information associated with entity taxes including taxation schedules, taxation rates, and/or past taxation filings. The entity federal taxation data 604 can be based at least in part on the entity data 302 and/or the entity data 402. For example, the entity's revenues and/or payrolls can provide a basis from which one or more taxes of the entity are calculated.

The entity and PEO federal taxation data 606 can include federal taxation information for the entity (e.g., the entity's FEIN, federal taxes paid in the past by the entity, current federal taxes owed by the entity, etc.) and/or federal taxation information for the PEO (e.g., the PEO's FEIN, federal taxes paid in the past by the PEO, current federal taxes owed by the PEO, etc.). The entity and PEO federal taxation data 606 can include information associated with federal taxation that is estimated to be payable and/or that was previously paid by the entity. The entity and PEO federal taxation data 606 can include information associated with federal taxation that is estimated to be payable and/or that was previously paid by the PEO. The entity and PEO federal taxation data 606 can include information associated with entity taxes including taxation schedules, taxation rates, and/or past taxation filings. The entity and PEO federal taxation data 606 can include information associated with PEO taxes including taxation schedules, taxation rates, and/or past taxation filings. The entity and PEO federal taxation data 606 can be based at least in part on the entity data 302 and/or the entity data 402. For example, the entity's revenues and/or payrolls can provide a basis from which one or more taxes of the entity are calculated. The entity and PEO federal taxation data 606 can be based at least in part on the PEO data 502. For example, the PEO's revenues and/or payrolls can provide a basis from which one or more taxes of the PEO are calculated.

The entity state A taxation data 608 can include information associated with the entity's state taxation data and/or state benefits data in a certain "state A" (e.g., Alaska), where such data can include, for instance: the entity's state A taxation account identification number; the entity's state A taxation obligations (e.g., taxes paid in the past by the entity to state A, taxes currently owed by the entity to state A, etc.); benefits provided by the entity to the entity's employees in state A (e.g., state A unemployment insurance benefits); and/or other state taxation and/or state benefits data of the entity with respect to state A. The entity state A taxation data 608 can include information associated with state taxation that is estimated to be payable and/or that was previously paid by the entity in a particular "state A" (e.g., the state of Alaska). The entity state A taxation data 608 can include information associated with entity taxes including taxation schedules, taxation rates, and/or past taxation filings in a particular "state A". The entity state A taxation data 608 can be based at least in part on the entity data 302 and/or the entity data 402. For example, the entity's revenues and/or payrolls can provide a basis from which one or more taxes of the entity are calculated. Further, the entity state A taxation data 608 can use information from the entity federal taxation data 604 to determine one or more benefits and/or taxes that are due in a state A. For example, certain information including, for instance, the entity data 302 and/or the entity data 402 (e.g., the name of the entity and/or the annual revenue of the entity) can be used to determine the entity state A taxation data 608.

The entity state B taxation data 610 can include information associated with the entity's state taxation data and/or state benefits data in a certain "state B" (e.g., New York), where such data can include, for instance: the entity's state B taxation account identification number; the entity's state B taxation obligations (e.g., taxes paid in the past by the entity to state B, taxes currently owed by the entity to state B, etc.); benefits provided by the entity to the entity's employees in state B (e.g., state B unemployment insurance benefits); and/or other state taxation and/or state benefits data of the entity with respect to state B. The entity state B taxation data 610 can include information associated with state taxation that is estimated to be payable and/or that was previously paid by the entity in a particular "state B" (e.g., the state of New York) that is different from the "state A" of the entity state A taxation data 608. The entity state B taxation data 610 can include information associated with entity taxes including taxation schedules, taxation rates, and/or past taxation filings in a particular "state B". The entity state B taxation data 610 can be based at least in part on the entity data 302 and/or the entity data 402. For example, the entity's revenues and/or payrolls can provide a basis from which one or more taxes of the entity are calculated. Further, the entity state B taxation data 610 can use information from the entity federal taxation data 604 to determine one or more benefits and/or taxes that are due in a state B. For example, certain information including the entity data 302 and/or the entity data 402 (e.g., the name of the entity and/or the annual revenue of the entity) can be used to determine the entity state B taxation data 610.

The entity or PEO state taxation data 612 can include information associated with state taxation data and/or state benefits data of the entity or the PEO in a certain state (e.g., Alaska, New York, etc.), where such data can include, for instance: state taxation account identification number of the entity or the PEO in a certain state; state taxation obligations of the entity or the PEO in a certain state (e.g., taxes paid in the past by the entity or the PEO to the state, taxes currently owed by the entity or the PEO to state, etc.), benefits respectively provided by the entity or the PEO to the entity's employees or the PEO's employees in a certain state (e.g., state unemployment insurance benefits), and/or other state taxation and/or state benefits data of the entity or the PEO with respect to a certain state.

In one embodiment, the entity or PEO state taxation data 612 can include information associated with state taxation that is estimated to be payable and/or that was previously paid by the entity in a particular state (e.g., Alaska). In this embodiment, the entity or PEO state taxation data 612 can include information associated with entity taxes including taxation schedules, taxation rates, and/or past taxation filings in a particular state. In this embodiment, the entity or PEO state taxation data 612 can be based at least in part on the entity data 302 and/or the entity data 402. For example, the entity's revenues and/or payrolls can provide a basis from which one or more taxes of the entity are calculated. Further, in some embodiments, the entity or PEO state taxation data 612 can use information from the entity federal taxation data 604 to determine one or more benefits and/or taxes that are due in a particular state. For example, certain information including, for instance, the entity data 302 and/or the entity data 402 (e.g., the name of the entity and/or the annual revenue of the entity) can be used to determine the entity or PEO state taxation data 612.

In an alternative and/or additional embodiment, the entity or PEO state taxation data 612 can include information associated with state taxation that is estimated to be payable and/or that was previously paid by the PEO in a particular state (e.g., Alaska, New York, etc.). In this embodiment, the entity or PEO state taxation data 612 can include information associated with PEO taxes including taxation schedules, taxation rates, and/or past taxation filings in a particular state. In this embodiment, the entity or PEO state taxation data 612 can be based at least in part on the PEO data 502. For example, the PEO's revenues and/or payrolls can provide a basis from which one or more taxes of the PEO are calculated. Further, in some embodiments, the entity or PEO state taxation data 612 can use information from the PEO federal taxation data 504 to determine one or more benefits and/or taxes that are due in a particular state. For example, certain information including, for instance, the PEO data 502 (e.g., the name of the PEO and/or the annual revenue of the PEO) can be used to determine the entity or PEO state taxation data 612.

To generate organizational data 600 at runtime (e.g., at a reporting runtime) without intermingling the data of the entity and/or the PEO, which can be stored in a centralized database (e.g., a multi-tenant database, the one or more memory devices 116, etc.), a computing system according to one or more embodiments of the present disclosure (e.g., the computing system 110) can generate and/or maintain multiple sets of data objects that can respectively correspond to the entity and the PEO. In these one or more embodiments, the computing system can store the multiple sets of data objects (e.g., in the form of data graphs) in a centralized database (e.g., a multi-tenant database) such as, for instance, the one or more memory devices 116. In these one or more embodiments, the multiple sets of data objects can further respectively correspond to multiple reporting locations such as, for instance, state A, state B, the Internal Revenue Service (IRS), and/or another reporting location associated with the entity and/or the PEO. In these one or more embodiments, the multiple sets of data objects can respectively include one or more values corresponding to one or more data fields.

In some embodiments, the one or more values can constitute and/or include one or more reporting values and the one or more data fields can constitute and/or include one or more reporting data fields. In these embodiments, the one or more reporting values can include, but are not limited to, the organizational data 204, the entity data 302, the federal taxation data 304, the state taxation data 306, the identifier data 308, the name data 310, the website data 312, the EIN data 314, the federal name data 316, the legal entity type data 318, the state code data 320, the state name data 322, the account id data 324, the rate data 326, and/or another reporting value. In these embodiments, the one or more reporting data fields can include, but are not limited to, the entity with PEO data 602, the entity federal taxation data 604, the entity and PEO federal taxation data 606, the entity state A taxation data 608, the entity state B taxation data 610, the entity or PEO state taxation data 612, and/or another reporting data field.

At a reporting runtime, the computing system (e.g., the computing system 110) according to one or more embodiments of the present disclosure can execute a hybrid class that can generate a hybrid runtime data object that can include location-specific reporting data (e.g., federal and/or state taxation reporting data) that can correspond to the entity, the PEO, and/or the multiple reporting locations. In these one or more embodiments, in executing the hybrid class at the reporting runtime to generate the hybrid runtime data object, the computing system (e.g., the computing system 110) can evaluate a mapping file of the hybrid class with respect to a certain reporting location (e.g., with respect to the IRS, state A, state B, etc.) to determine whether to retrieve a reporting value of a reporting data field associated with the location-specific reporting data from a first data object corresponding to the entity or from a second data object corresponding to the PEO. In these one or more embodiments, the mapping file can constitute and/or include, for instance, an index, a list, a configuration file, and/or a look-up table that can be configured such that it indicates, with respect to the certain reporting location (e.g., with respect to the IRS, state A, state B, etc.), whether the reporting data field is associated with the entity or the PEO. For example, in some embodiments, the mapping file can constitute and/or include an index, a list, and/or a look-up table that respectively associates multiple reporting data fields with multiple reporting locations, and further associates the multiple reporting data fields and the multiple reporting locations with either the entity or the PEO. In these example embodiments, the mapping file can be configured such that upon evaluation of the mapping file (e.g., by the computing system 110), the mapping file can indicate whether a reporting value corresponding to a certain reporting data field associated with a certain reporting location should be retrieved from a first data object corresponding to the entity or from a second data object corresponding to the PEO.

In one or more embodiments, based at least in part on such evaluation of the mapping file, the computing system (e.g., the computing system 110) can access (e.g., via the one or more processors 114) the first data object or the second data object to retrieve the reporting value, thereby preventing intermingling of data respectively corresponding to the entity and the PEO. In some embodiments, based at least in part on such evaluation of the mapping file, the computing system can access a first data model (e.g., first data graph) including the first data object or a second data graph (e.g., a second data graph) including the second data object to retrieve the reporting value, where the first data model can correspond to the entity and the second data model can correspond to the PEO, or vice versa. In these embodiments, by accessing either the first data model or the second data model to retrieve the report value at a reporting runtime, the computing system can thereby prevent intermingling of data respectively corresponding to the entity and the PEO at the reporting runtime.

In some embodiments of the present disclosure, the computing system (e.g., the computing system 110) can further generate a report such as, for instance, the organizational data 600 based at least in part on the hybrid runtime data object. For example, based at least in part on the above-described execution of the hybrid class to generate the hybrid runtime data object and/or evaluation of the mapping file, the computing system can access either the first data object or the second data object to retrieve the reporting value, which can then be used by the computing system to generate a report such as, for instance, the organizational data 600. In some embodiments, the computing system can further output such a report (e.g., via a graphical user interface (GUI) and/or a display of the computing system such as, for instance, the one or more output devices 124).

In one example embodiment, at a reporting runtime, to retrieve a reporting value corresponding to, for instance, the entity or PEO state taxation data 612 of the organizational data 600, the computing system (e.g., the computing system 110) can: execute the hybrid class to generate the hybrid runtime data object that can include state-specific taxation reporting data (e.g., taxation reporting data associated with Alaska, New York, etc.) that can correspond to the entity, the PEO, and a certain taxation reporting state (e.g., Alaska, New York, etc.); evaluate the mapping file of the hybrid class with respect to the taxation reporting state (e.g., Alaska, New York, etc.) to determine whether to retrieve a state taxation account identification number from a first data object corresponding to the entity or from a second data object corresponding to the PEO; and/or access the first data object to retrieve the entity's state taxation account identification number for the taxation reporting state (e.g., Alaska, New York, etc.) or the second data object to retrieve the PEO's state taxation account identification number for the taxation reporting state (e.g., Alaska, New York, etc.). In this example embodiment, by accessing either the first data object or the second data object to retrieve the appropriate state taxation account identification number for the taxation reporting state, the computing system can thereby prevent intermingling of data respectively corresponding to the entity and the PEO at the reporting runtime.

Figure 7:
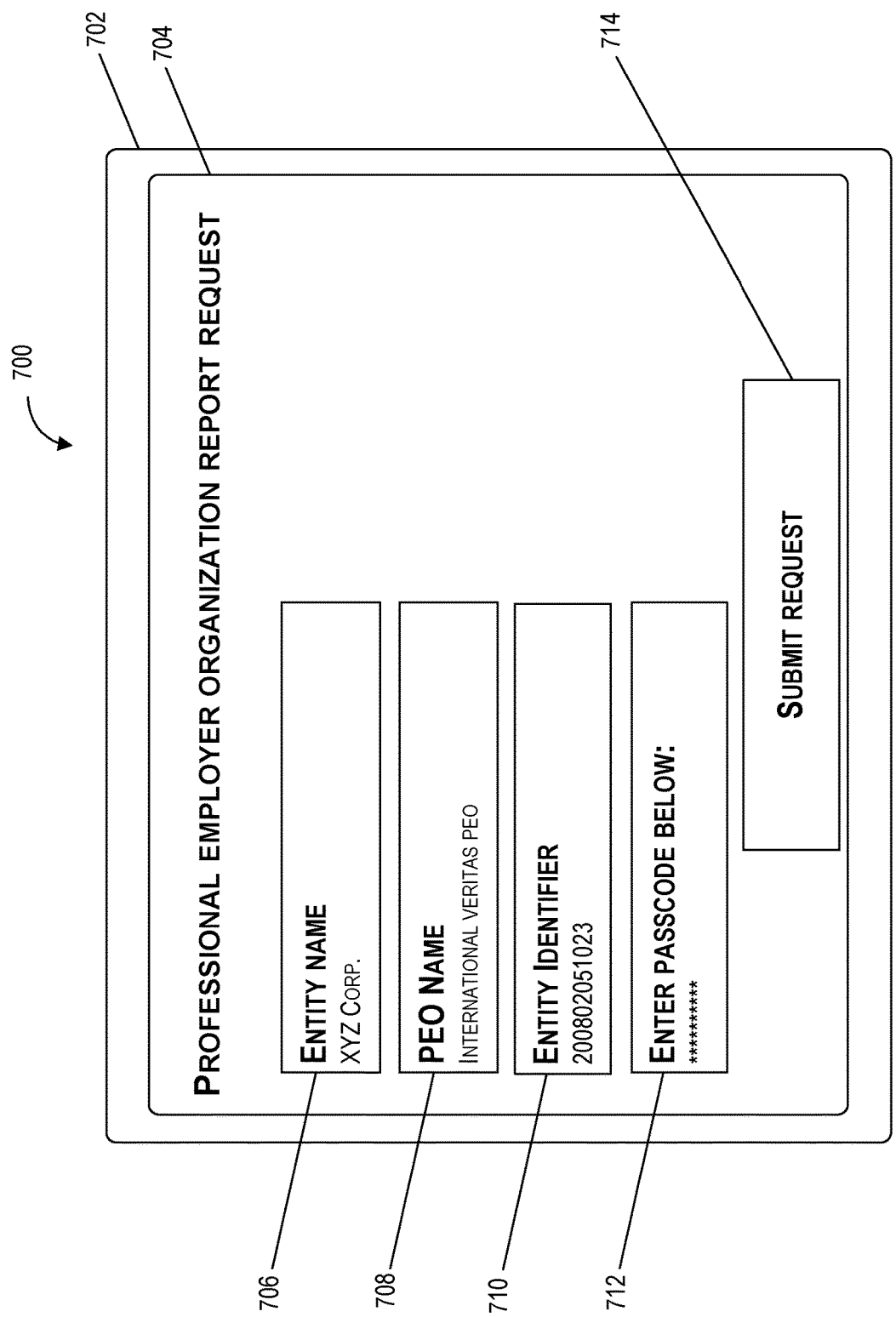
FIG. 7 depicts an example of generating a request for professional employer organization reports at runtime according to example embodiments of the present disclosure.

FIG. 7 depicts an example of a graphical user interface for requesting PEO reports according to example embodiments of the present disclosure. A computing device 700 can include one or more attributes and/or capabilities of the computing system 110, the remote computing system 130, the one or more computing devices 152, and/or the computing device 200. Furthermore, the computing device 700 can be configured to perform one or more operations and/or one or more actions that can be performed by the computing system 110, the remote computing system 130, the one or more computing devices 152, and/or the computing device 200.

As shown in FIG. 7, the computing device 700 includes a display component 702, a user interface 704, an interface element 706, an interface element 708, an interface element 710, and an interface element 712.

In this example, the computing device 700 is configured to generate output including a user interface 704 (e.g., a graphical user interface) that includes the interface element 706, the interface element 708, the interface element 710, and the interface element 712 which are displayed on the display component 702. The output of the computing device 700 can be used to generate request data that is associated with a request for one or more reports (e.g., one or more PEO reports) associated with an entity (e.g., an organization that has a relationship with a PEO).

The display component 702 can be configured to receive one or more inputs to cause the computing device 700 to perform one or more operations (e.g., operations associated with accessing request data). For example, the display component 702 can be configured to receive one or more touch inputs from a user to indicate the selection by the user of an interface element that is displayed on the user interface 704. In some embodiments, the computing device 700 can receive other types of input including audio input (e.g., a user speaking a command to select an interface element), an external input device (e.g., a mouse device or keyboard), or a gesture (e.g., a gesture recognized by a camera of the computing device 700). In some embodiments, the computing device 700 can be configured to receive one or more inputs from one or more other computing devices (e.g., a laptop computer, a desktop computer, and/or a smartphone) that communicate with the computing device 700.

The user interface 704 includes the interface element 706, the interface element 708, the interface element 710, and the interface element 712 which are configured to receive one or more inputs to generate request data that is used to generate a request for one or more PEO reports associated with an entity. The interface element 706 indicates an entity name associated with the entity (e.g., the organization) for which a professional organization report is being requested. In this example, the interface element 706 is populated based at least in part on one or more inputs that were previously provided by the user to indicate the identity of the entity. The interface element 708 indicates a PEO (PEO) name associated with the PEO that the entity is associated with. In this example, the interface element 708 is populated based at least in part on one or more inputs that were previously provided by the user to indicate the identity of the PEO.

As shown, the interface element 708 indicates the entity name "International Veritas PEO" which is the legal name of the PEO.

The interface element 710 indicates an organization or employee identifier (e.g., "200802051023") that uniquely identifies the entity (e.g., the organization) that is associated with the request. The organization or employee identifier in the interface element 708 is populated based at least in part on the one or more inputs that were previously provided by the user to indicate the identity of the PEO.

The interface element 712 is used to receive a passcode to make the request for the PEO report. The computing device 700 will determine whether the passcode entered in the interface element 712 matches the stored passcode that allows access to the organizational data used to generate a PEO report for the entity.

The interface element 714, which indicates "SUBMIT REQUEST" is a control element that can be used to generate the request data associated with the entity name indicated in the interface element 706. For example, a user touching the interface element 714 can cause the computing device 700 to generate request data associated with a request for a PEO report associated with the XYZ Corp indicated in the interface element 706. Further, the computing device 700 can perform one or more operations including accessing organizational data associated with the entity indicated in the interface element 706, accessing regulatory data associated with regions in which the entity operates, and generating one or more reports based on one or more operations (e.g., one or more runtime operations) performed on the regulatory data and the organizational data.

Figure 8:
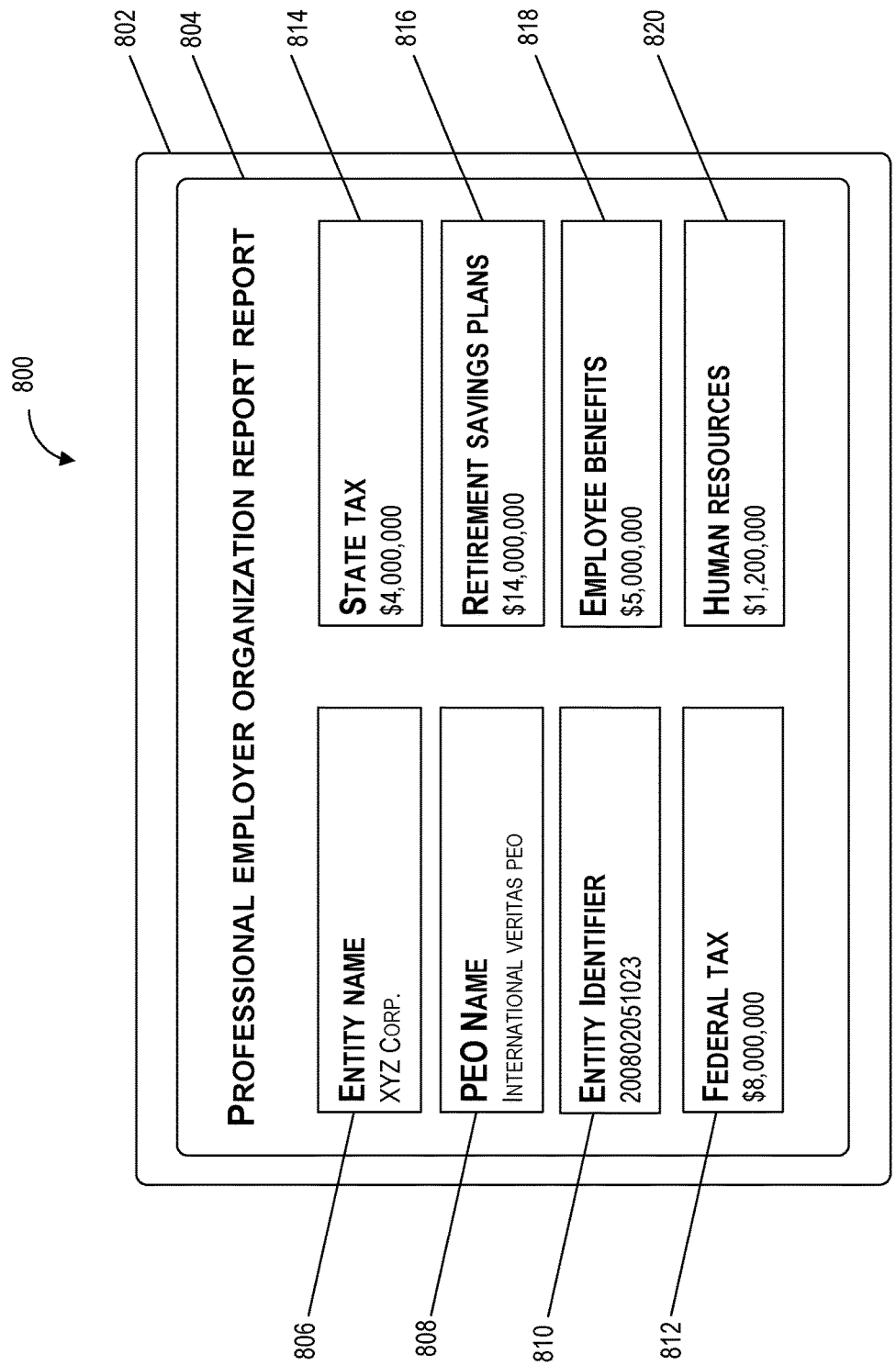
FIG. 8 depicts an example of professional employer organization reports according to example embodiments of the present disclosure.

FIG. 8 depicts an example of output including a PEO report according to example embodiments of the present disclosure. A computing device 800 can include one or more attributes and/or capabilities of the computing system 110, the remote computing system 130, the one or more computing devices 152, and/or the computing device 200. Furthermore, the computing device 800 can be configured to perform one or more operations and/or one or more actions that can be performed by the computing system 110, the remote computing system 130, the one or more computing devices 152, and/or the computing device 200.

As shown in FIG. 8, the computing device 800 includes a display component 802, a user interface 804, an interface element 806, an interface element 808, an interface element 810, an interface element 812, an interface element 814, an interface element 816, an interface element 818, and an interface element 820.

In this example, the computing device 800 is configured to generate output including a user interface 804 (e.g., a graphical user interface) that includes the interface element 806, the interface element 808, the interface element 810, and the interface element 812 which are displayed on the display component 802. The output of the computing device 800 can be used to generate request data that is associated with a request for one or more reports (e.g., one or more PEO reports) associated with an entity (e.g., an organization that has a relationship with a PEO).

The display component 802 can be configured to receive one or more inputs to cause the computing device 800 to perform one or more operations (e.g., operations associated with accessing request data). For example, the display component 802 can be configured to receive one or more touch inputs from a user to indicate the selection by the user of an interface element that is displayed on the user interface 804. In some embodiments, the computing device 800 can receive other types of input including audio input (e.g., a user speaking a command to select an interface element), an external input device (e.g., a mouse device or keyboard), or a gesture (e.g., a gesture recognized by a camera of the computing device 800). In some embodiments, the computing device 800 can be configured to receive one or more inputs from one or more other computing devices (e.g., a laptop computer, a desktop computer, and/or a smartphone) that communicate with the computing device 800.

The user interface 804 includes the interface element 806, the interface element 808, the interface element 810, and the interface element 812 which are configured to receive one or more inputs to generate request data that is used to generate a request for one or more PEO reports associated with an entity. The interface element 806 indicates an entity name associated with the entity (e.g., the organization) for which a professional organization report is being requested. In this example, the interface element 806 is populated based at least in part on one or more inputs that were previously provided by the user to indicate the identity of the entity. The interface element 808 indicates a PEO (PEO) name associated with the PEO that the entity is associated with. In this example, the interface element 808 is populated based at least in part on one or more inputs that were previously provided by the user to indicate the identity of the PEO. As shown, the interface element 808 indicates the entity name "International Veritas PEO" which is the legal name of the PEO.

The interface element 810 indicates an organization or employee identifier (e.g., "200802051023") that uniquely identifies the entity (e.g., the organization) that is associated with the request. The organization or employee identifier in the interface element 808 is populated based at least in part on the one or more inputs that were previously provided by the user to indicate the identity of the PEO.

The interface element 812 indicates an amount of federal taxation that is estimated to be due for payment by the entity associated with the PEO report. The amount of federal taxation that is indicated in the interface element 812 is populated based at least in part on the regulatory data and organizational data associated with the entity indicated in the interface element 806.

The interface element 814 indicates an amount of state taxation that is estimated to be due for payment by the entity associated with the PEO report. The amount of state taxation that is indicated in the interface element 814 is populated based at least in part on the regulatory data and organizational data associated with the entity indicated in the interface element 806.

The interface element 816 indicates an amount of funds in a retirement savings plan for the entity that is estimated to be held by the entity associated with the PEO report. The amount of retirement savings in the employee savings plan of the employees of the entity that is indicated in the interface element 816 is populated based at least in part on the regulatory data and organizational data for the entity indicated in the interface element 806.

The interface element 818 indicates an amount of funds in employee benefits that are estimated to be payable to employees of the entity associated with the PEO report. The amount of employee benefits that is indicated in the interface element 818 is populated based at least in part on the regulatory data and organizational data for the entity indicated in the interface element 806.

The interface element 820 indicates an amount of funds dedicated to operating the human resources department for the entity associated with the PEO report. The amount of funds indicated in the interface element 820 is populated based at least in part on the regulatory data and organizational data for the entity indicated in the interface element 806.

Figure 9:
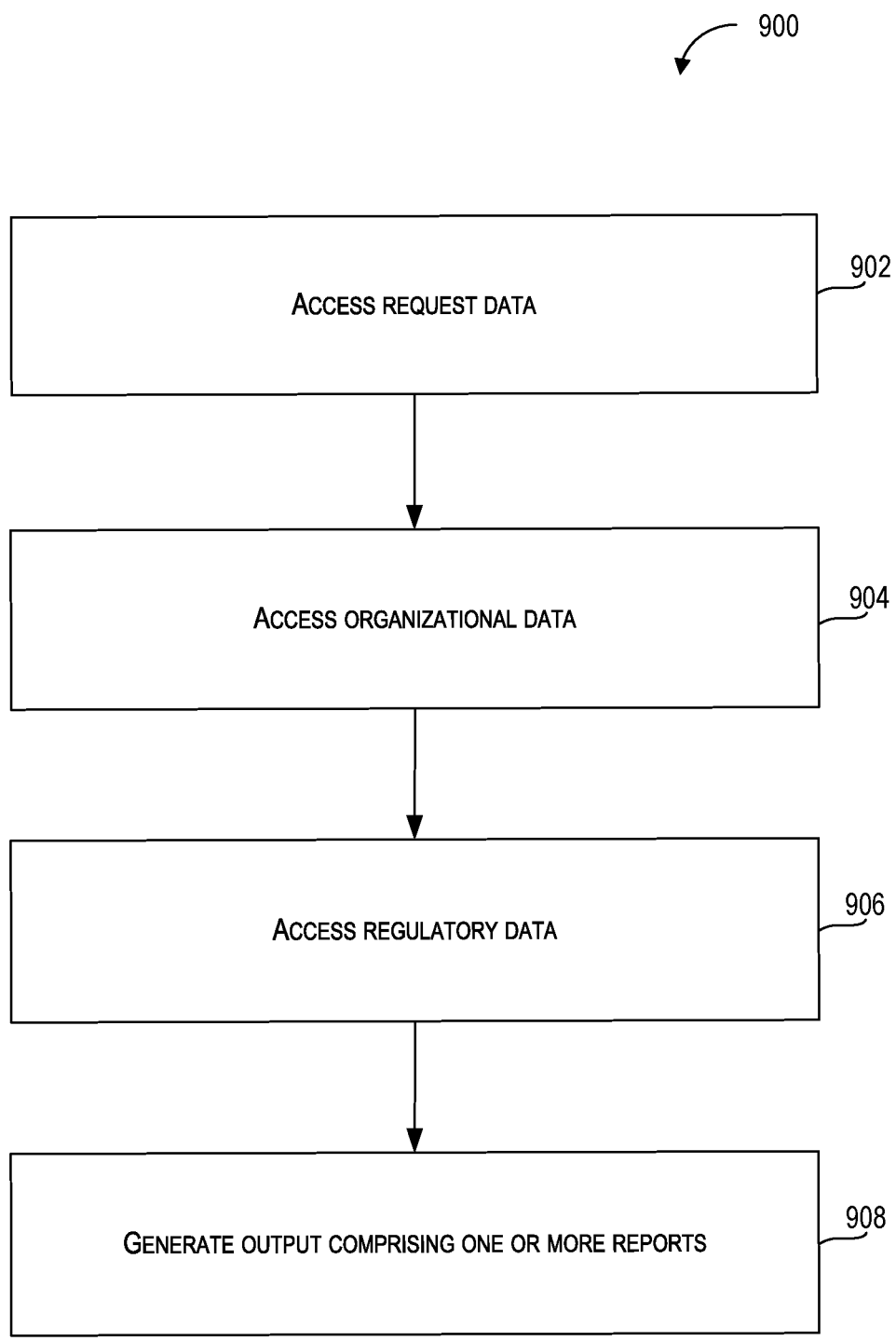
FIG. 9 depicts a flow diagram of generating professional employer organization reports at runtime according to example embodiments of the present disclosure.

FIG. 9 depicts a flow diagram of generating PEO reports at runtime according to example embodiments of the present disclosure. One or more portions of the method 900 can be executed and/or implemented on one or more computing devices or computing systems including, for example, the computing system 110, the remote computing system 130, the one or more computing devices 152, and/or the computing device 200. Further, one or more portions of the method 900 can be executed or implemented as an algorithm on the hardware devices or systems disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include accessing request data. The request data can include a request for one or more reports associated with one or more payrolls of an entity. For example, the computing system 110 can access organizational data that includes one or more organizational records associated with one or more payrolls of employees that are members of the accounting department of the organization.

At 904, the method 900 can include accessing, based at least in part on the request data, organizational data associated with the entity, wherein the organizational data comprises information associated with a plurality of entities comprising the entity, the one or more payrolls of the entity, and one or more regions associated with the entity, and wherein the organizational data is stored in a multi-tenant environment in which a plurality of datasets of the organizational data are respectively associated with the plurality of entities. For example, the computing system 110 can access organizational data that includes one or more organizational records associated with one or more payrolls of employees that are members of the accounting department of the organization.

At 906, the method 900 can include accessing, based at least in part on the request data, regulatory data comprising regulatory information for the one or more regions associated with the entity. For example, the computing system 110 can access regulatory data that includes one or more organizational records associated with regulations associated with one or more payrolls of employees that are members of the accounting department of the organization.

At 908, the method 900 can include generating, based at least in part on one or more runtime operations performed on the regulatory data and the organizational data associated with the entity, output comprising one or more reports associated with the entity. For example, the computing system 110 can generate one or more reports that can be displayed on a display output device of the computing system 110 or another computing system and/or computing device that is configured to receive information and/or data from the computing system 110. Further, the one or more reports can include information associated with the entity's taxation burden in various regions.

Figure 10:
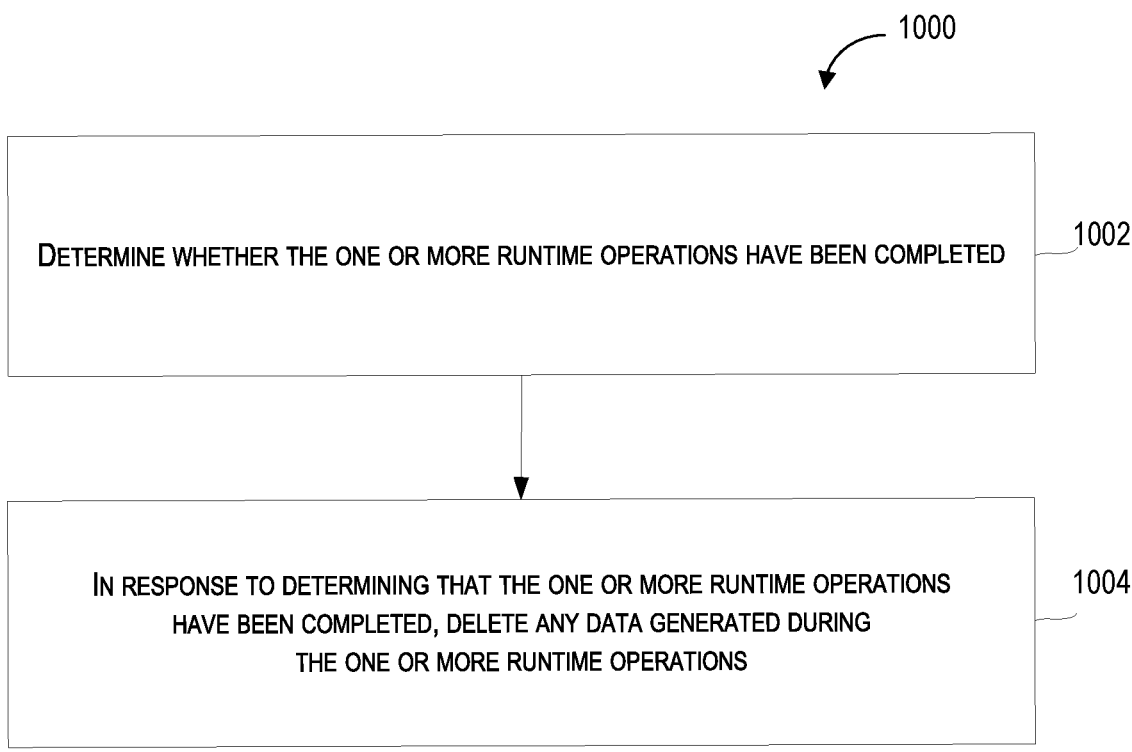
FIG. 10 depicts a flow diagram of generating professional employer organization reports at runtime according to example embodiments of the present disclosure.

FIG. 10 depicts a flow diagram of generating PEO reports at runtime according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. FIG. 10 depicts steps performed in a particular order for purposes of illustration and discussion. In some embodiments, one or more portions of the method 1000 can be performed as part of the method 900 that is depicted in FIG. 9. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining whether the one or more runtime operations have been completed. For example, the computing system 110 can determine whether each of the one or more runtime operations is still processing data (e.g., accessing data and/or performing operations on data).

At 1004, the method 1000 can include, in response to determining that the one or more runtime operations have been completed, deleting any data generated during the one or more runtime operations. For example, the computing system 110 can perform one or more operations associated with deleting data from volatile and non-volatile memory.

Figure 11:
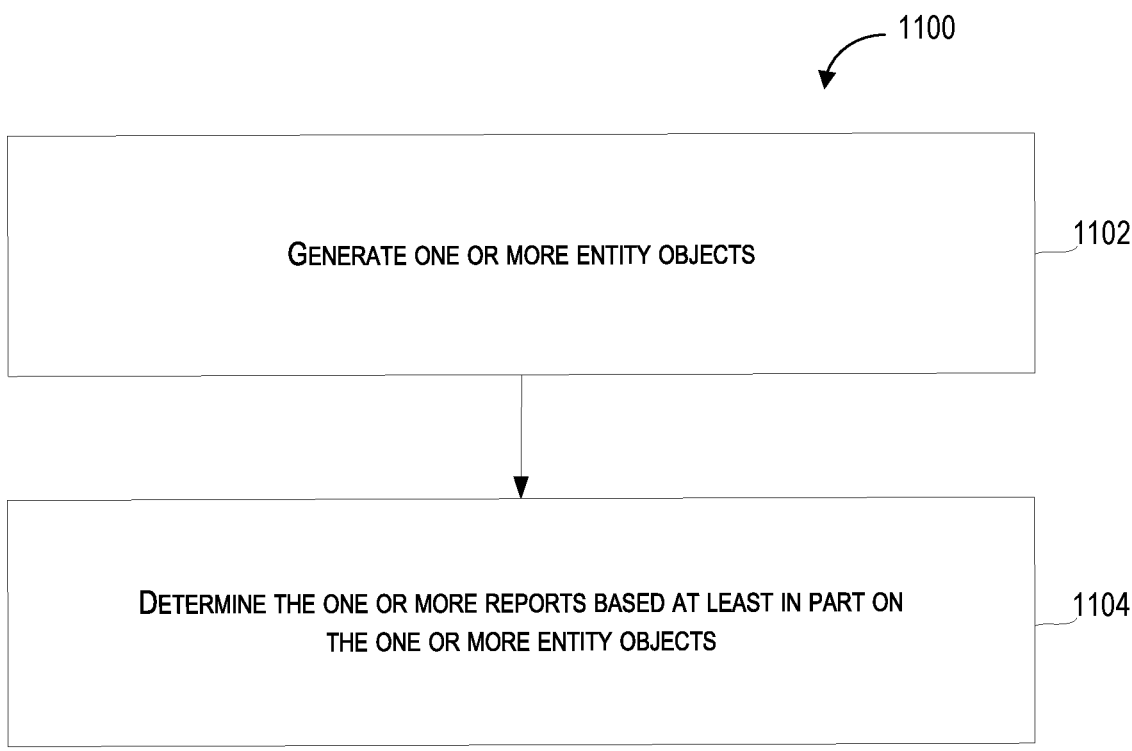
FIG. 11 depicts a flow diagram of generating professional employer organization reports at runtime according to example embodiments of the present disclosure.

FIG. 11 depicts a flow diagram of generating PEO reports at runtime according to example embodiments of the present disclosure. One or more portions of the method 1100 can be executed and/or implemented on one or more computing devices or computing systems including, for example, the computing system 110, the remote computing system 130, the one or more computing devices 152, and/or the computing device 200. Further, one or more portions of the method 1100 can be executed or implemented as an algorithm on the hardware devices or systems disclosed herein. FIG. 11 depicts steps performed in a particular order for purposes of illustration and discussion. In some embodiments, one or more portions of the method 1100 can be performed as part of the method 900 that is depicted in FIG. 9. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include generating at runtime, based at least in part on the organizational data and the regulatory data, one or more entity objects at runtime. The one or more entity objects can be respectively associated with the one or more regions. For example, if the entity does business in a federal region and two state regions of the federal region the computing system 110 could generate three entity objects including one entity object for the federal region and two entity objects for the state regions.

At 1104, the method 1100 can include determining the one or more reports based at least in part on the one or more entity objects. For example, the computing system 110 can use the data from the entity objects to generate the one or more reports. For example, the one or more entity objects can include the amount of benefits paid to one or more employees of the entity. The one or more benefits can be used as part of the determination of the amount of taxes owed by the entity that is included in the one or more reports.

Figure 12:
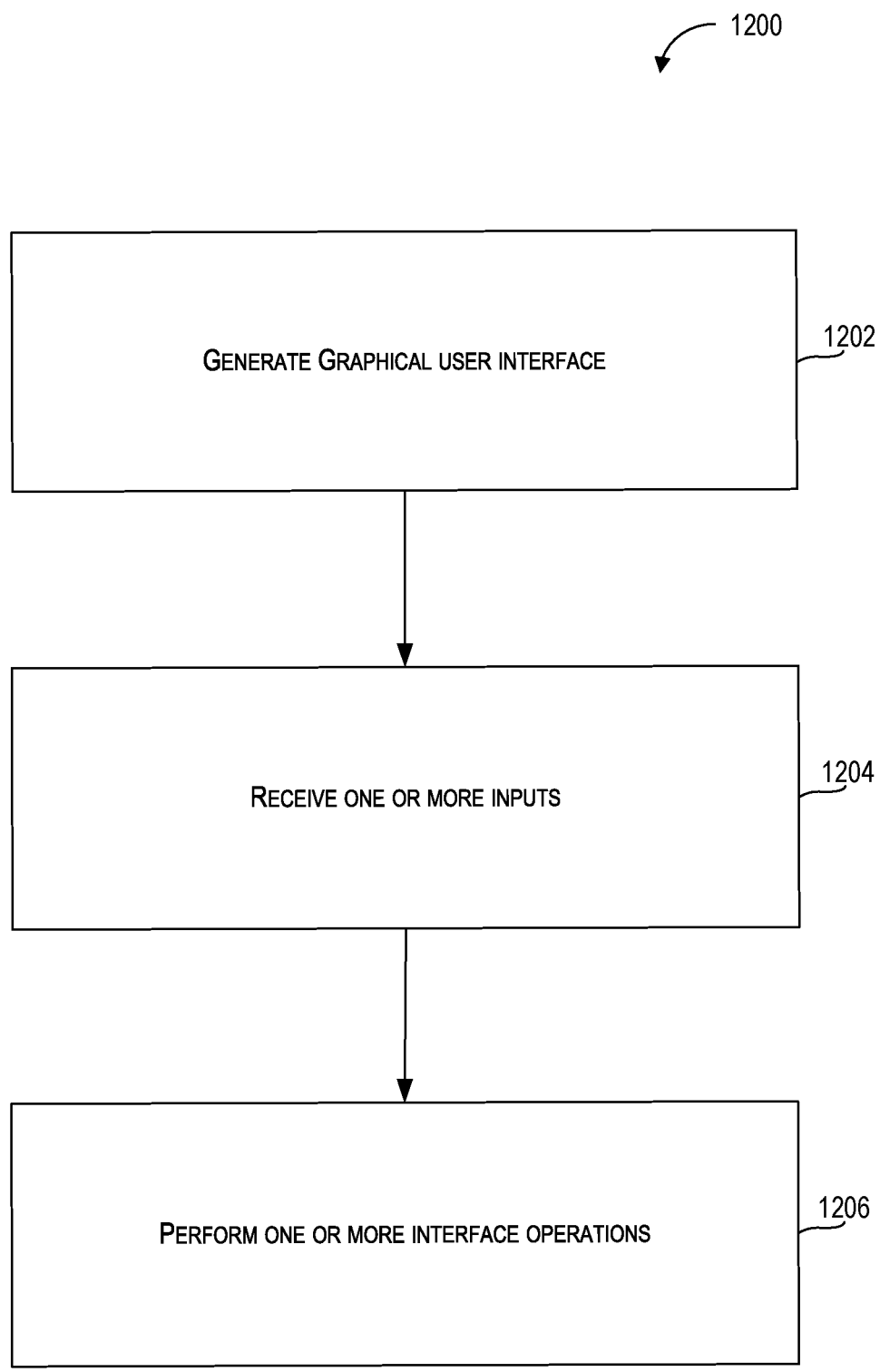
FIG. 12 depicts a flow diagram of generating professional employer organization reports at runtime according to example embodiments of the present disclosure.

FIG. 12 depicts a flow diagram of generating PEO reports at runtime according to example embodiments of the present disclosure. One or more portions of the method 1200 can be executed and/or implemented on one or more computing devices or computing systems including, for example, the computing system 110, the remote computing system 130, the one or more computing devices 152, and/or the computing device 200. Further, one or more portions of the method 1200 can be executed or implemented as an algorithm on the hardware devices or systems disclosed herein. FIG. 12 depicts steps performed in a particular order for purposes of illustration and discussion. In some embodiments, one or more portions of the method 1200 can be performed as part of the method 900 that is depicted in FIG. 9. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include generating a graphical user interface. The graphical user interface can include one or more interface elements associated with one or more reports. Further, the one or more interface elements can be configured to receive one or more inputs. For example, the computing system 110 can generate a graphical user interface on a display output device (e.g., a touchscreen display device) that shows a representation of the one or more reports and includes interface elements that the user can use to add notes to the one or more reports.

At 1204, the method 1200 can include receiving the one or more inputs. For example, the computing system 110 can include a touch screen display that can display the one or more entries. The user can touch the portion of the touch screen display that includes the one or more reports and can then use an on-screen keyboard to navigate the one or more reports.

At 1206, the method 1200 can include performing, based at least in part on the one or more inputs, one or more interface operations on the one or more reports. For example, the computing system 110 can use the input provided by the user and modify an existing entry of a report with the entry specified by the one or more inputs provided by the user.

Figure 13:
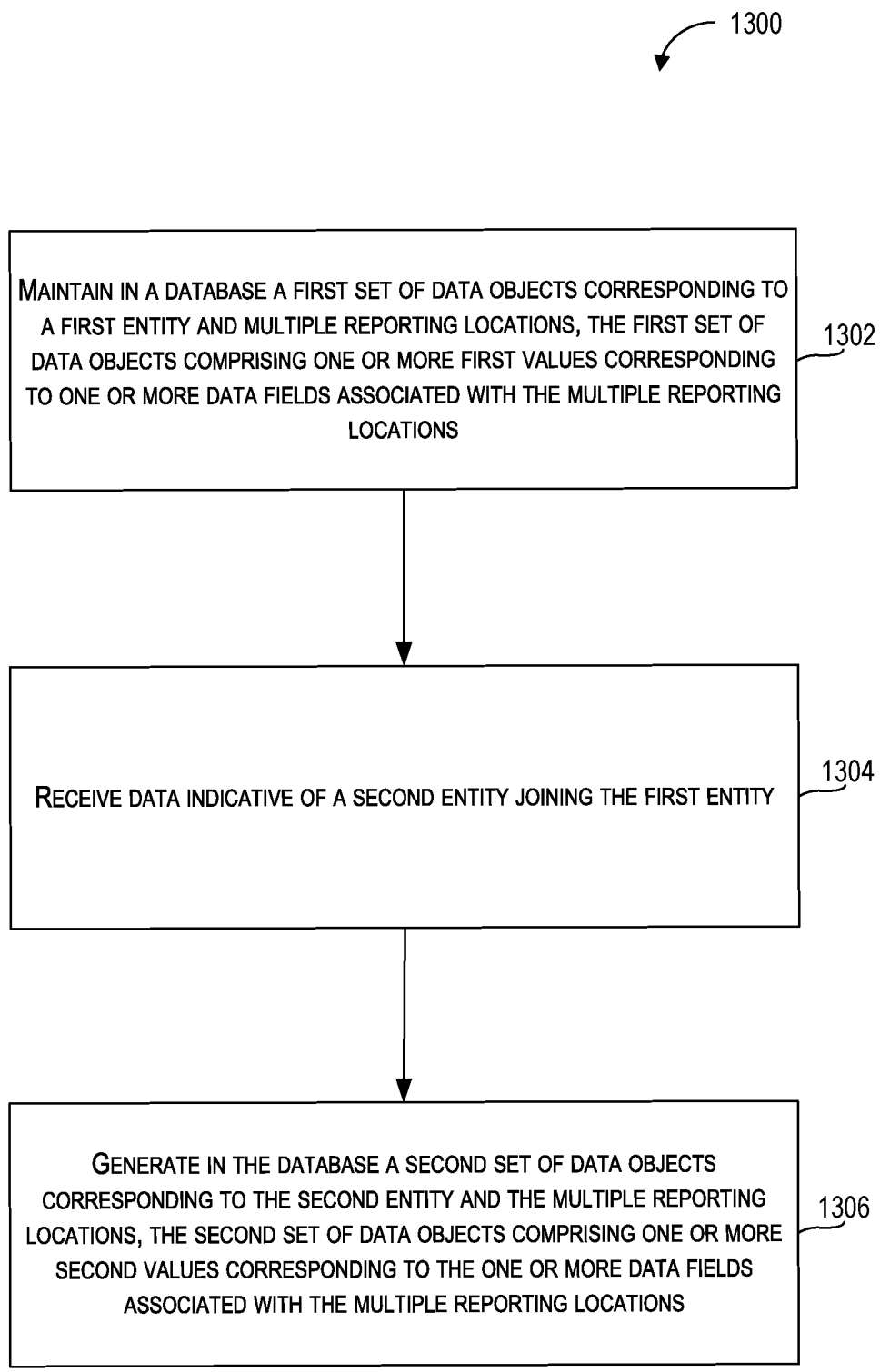
FIG. 13 depicts a flow diagram of generating professional employer organization reports at runtime according to example embodiments of the present disclosure.

FIG. 13 depicts a flow diagram of generating PEO reports at runtime according to example embodiments of the present disclosure. One or more portions of the method 1300 can be executed and/or implemented on one or more computing devices or computing systems including, for example, the computing system 110, the remote computing system 130, the one or more computing devices 152, and/or the computing device 200. Further, one or more portions of the method 1300 can be executed or implemented as an algorithm on the hardware devices or systems disclosed herein. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include maintaining in a database a first set of data objects corresponding to a first entity and multiple reporting locations, the first set of data objects comprising one or more first values corresponding to one or more data fields associated with the multiple reporting locations. For example, the computing system 110 can maintain in a centralized database (e.g., a multi-tenant database, the one or more memory devices 116) a first set of data objects (e.g., in the form of a first data model and/or graph) corresponding to a PEO and multiple taxation reporting locations (e.g., the IRS, Alaska, New York, etc.), where the first set of data objects includes one or more first values (e.g., taxation account identification numbers) corresponding to one or more data fields (e.g., the entity or PEO state taxation data 612) associated with the multiple taxation reporting locations.

At 1304, the method 1300 can include receiving data indicative of a second entity joining the first entity. For example, the computing system can receive (e.g., via a graphical user interface of the computing system and/or the one or more input devices 122) data indicating that an organization (e.g., a company) has become a member and/or a client organization of the PEO.

At 1306, the method 1300 can include generating in the database a second set of data objects corresponding to the second entity and the multiple reporting locations, the second set of data objects comprising one or more second values corresponding to the one or more data fields associated with the multiple reporting locations. For example, the computing system 110 can generate in the centralized database (e.g., a multi-tenant database, the one or more memory devices 116) a second set of data objects (e.g., in the form of a second data model and/or graph) corresponding to the organization and the multiple taxation reporting locations (e.g., the IRS, Alaska, New York, etc.), where the second set of data objects includes one or more second values (e.g., taxation account identification numbers) corresponding to the one or more data fields (e.g., the entity or PEO state taxation data 612) associated with the multiple taxation reporting locations.

Figure 14:
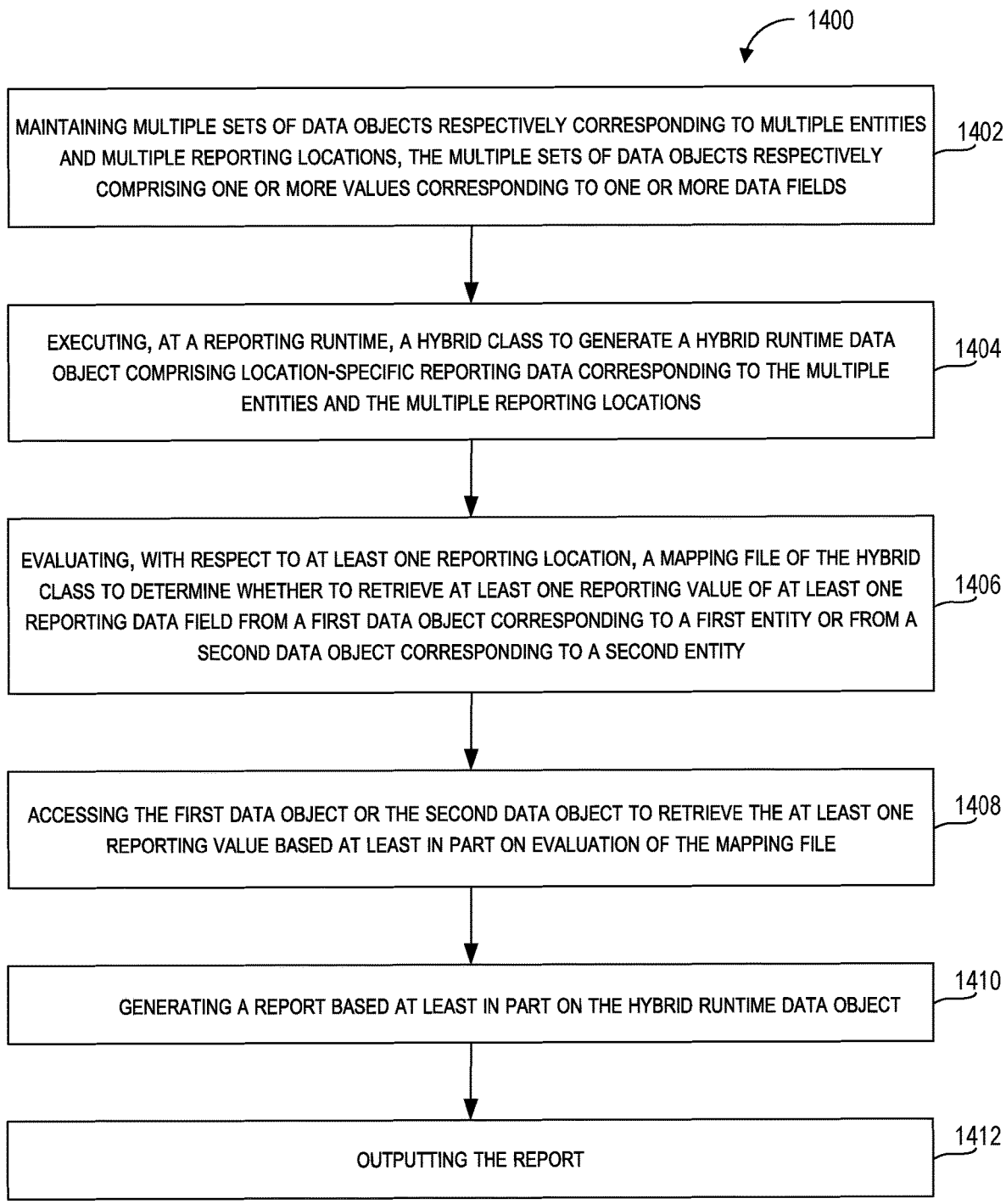
FIG. 14 depicts a flow diagram of generating professional employer organization reports at runtime according to example embodiments of the present disclosure.

FIG. 14 depicts a flow diagram of generating PEO reports at runtime according to example embodiments of the present disclosure. One or more portions of the method 1400 can be executed and/or implemented on one or more computing devices or computing systems including, for example, the computing system 110, the remote computing system 130, the one or more computing devices 152, and/or the computing device 200. Further, one or more portions of the method 1400 can be executed or implemented as an algorithm on the hardware devices or systems disclosed herein. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include maintaining (e.g., by the computing system 110, in a multi-tenant database and/or the one or more memory devices 116) multiple sets of data objects (e.g., in the form of multiple data models and/or graphs) respectively corresponding to multiple entities (e.g., a PEO, a client organization of the PEO, etc.) and multiple reporting locations (e.g., taxation reporting locations such as, for instance, the IRS, Alaska, New York, etc.), the multiple sets of data objects respectively comprising one or more values (e.g., taxation account identification numbers) corresponding to one or more data fields (e.g., the entity or PEO state taxation data 612).

At 1404, the method 1400 can include executing (e.g., by the computing system 110), at a reporting runtime, a hybrid class to generate a hybrid runtime data object comprising location-specific reporting data (e.g., state-specific taxation reporting data) corresponding to the multiple entities and the multiple reporting locations.

At 1406, the method 1400 can include evaluating (e.g., by the computing system 110), with respect to at least one reporting location (e.g., Alaska), a mapping file (e.g., an index, a list, a configuration file, a look-up table, etc.) of the hybrid class to determine whether to retrieve at least one reporting value (e.g., taxation account identification number) of at least one reporting data field (e.g., the entity or PEO state taxation data 612) from a first data object (e.g., a first data model and/or graph) corresponding to a first entity (e.g., a PEO) or from a second data object (e.g., a second data model and/or graph) corresponding to a second entity (e.g., a client organization of a PEO).

At 1408, the method 1400 can include accessing (e.g., by the computing system 110) the first data object or the second data object to retrieve the at least one reporting value based at least in part on evaluation of the mapping file.

At 1410, the method 1400 can include generating (e.g., by the computing system 110) a report (e.g., the organizational data 600) based at least in part on the hybrid runtime data object (e.g., based at least in part on execution of the hybrid class to generate the hybrid runtime data object and evaluation of the mapping file to determine from which data object to retrieve the at least one reporting value).

At 1412, the method 1400 can include outputting the report (e.g., by the computing system 110 via a user graphical interface (GUI) and/or a display of the computing system such as, for instance, the one or more output devices 124).

Figure 15:
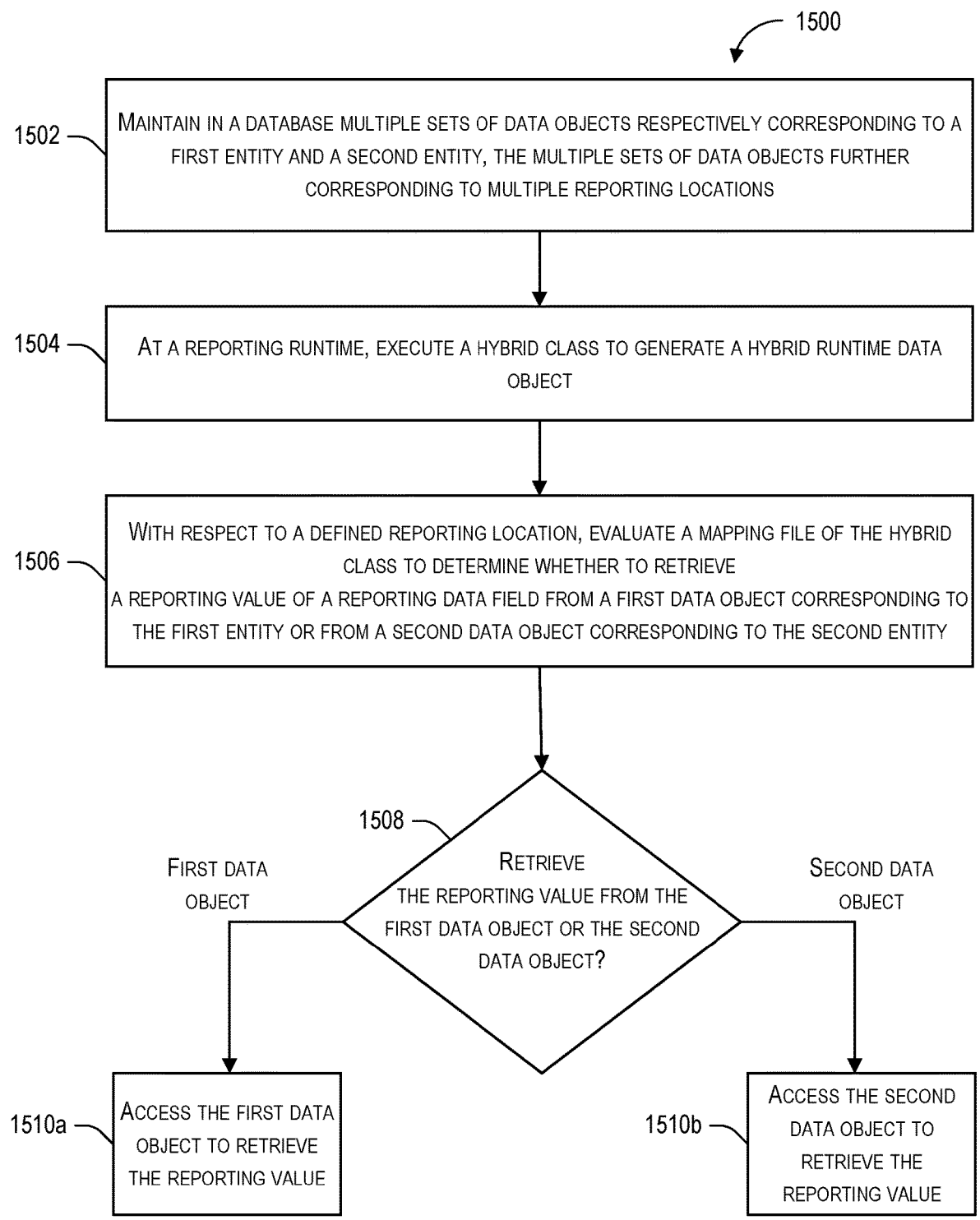
FIG. 15 depicts a flow diagram of generating professional employer organization reports at runtime according to example embodiments of the present disclosure.

FIG. 15 depicts a flow diagram of generating PEO reports at runtime according to example embodiments of the present disclosure. One or more portions of the method 1500 can be executed and/or implemented on one or more computing devices or computing systems including, for example, the computing system 110, the remote computing system 130, the one or more computing devices 152, and/or the computing device 200. Further, one or more portions of the method 1500 can be executed or implemented as an algorithm on the hardware devices or systems disclosed herein. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include maintaining (e.g., by the computing system 110) in a database (e.g., a multi-tenant database and/or the one or more memory devices 116) multiple sets of data objects (e.g., in the form of multiple data models and/or graphs) respectively corresponding to a first entity (e.g., a PEO) and a second entity (e.g., a client organization of a PEO), the multiple sets of data objects further corresponding to multiple reporting locations (e.g., taxation reporting locations such as, for instance, the IRS, Alaska, New York, etc.).

At 1504, the method 1500 can include, at a reporting runtime, executing (e.g., by the computing system 110) a hybrid class to generate a hybrid runtime data object (e.g., a hybrid runtime data object comprising location-specific reporting data such as, for instance, state-specific taxation reporting data corresponding to the first entity, the second entity, and/or the multiple reporting locations).

At 1506, the method 1500 can include, with respect to a defined reporting location (e.g., Alaska), evaluate (e.g., by the computing system 110) a mapping file (e.g., an index, a list, a configuration file, a look-up table, etc.) of the hybrid class to determine whether to retrieve a reporting value (e.g., taxation account identification number) of a reporting data field (e.g., the entity or PEO state taxation data 612) from a first data object (e.g., a first data model and/or graph) corresponding to the first entity or from a second data object (e.g., a second data model and/or graph) corresponding to the second entity.

At 1508, the method 1500 can include determining (e.g., by the computing system 110) whether to retrieve the reporting value from the first data object or the second data object.

If it is determined at 1508 to retrieve the reporting value from the first data object, then at 1510*a*, the method 1500 can include accessing (e.g., by the computing system 110) the first data object to retrieve the reporting value.

If it is determined at 1508 to retrieve the reporting value from the second data object, then at 1510*b*, the method 1500 can include accessing (e.g., by the computing system 110) the second data object to retrieve the reporting value.

Although not illustrated in the example embodiment depicted in FIG. 15, in some embodiments, method 1500 can further include generating (e.g., by the computing system 110) a report (e.g., the organizational data 600) based at least in part on the hybrid runtime data object and/or the reporting value (e.g., based at least in part on execution of the hybrid class to generate the hybrid runtime data object, evaluation of the mapping file to determine from which data object to retrieve the reporting value, and retrieval of the reporting value). In these embodiments, although not illustrated in the example embodiment depicted in FIG. 15, method 1500 can further include outputting the report (e.g., by the computing system 110 via a user graphical interface (GUI) and/or a display of the computing system such as, for instance, the one or more output devices 124).

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "determining," "identifying," "adjusting," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the appended claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors; and
   one or more memory devices that store instructions that, when executed by the one or more processors, cause the computing system to perform operations, the operations comprising:
   maintaining multiple sets of data objects respectively corresponding to multiple entities and multiple reporting locations, the multiple sets of data objects respectively comprising one or more values corresponding to one or more data fields;
   executing a hybrid class to generate a hybrid runtime data object comprising location-specific reporting data corresponding to the multiple entities and the multiple reporting locations,
   wherein executing the hybrid class to generate the hybrid runtime data object comprises:
   executing the hybrid class to generate an object instance of the hybrid class:
   determining, with respect to at least one reporting location, using associations of a mapping file of the hybrid class whether to retrieve at least one reporting value of at least one reporting data field from a first data object corresponding to a first entity or from a second data object corresponding to a second entity, wherein the associations of the mapping file associate multiple reporting data fields with multiple reporting locations, and wherein the associations of the mapping file further associate the multiple reporting data fields and the multiple reporting locations with the first entity or the second entity;
   accessing the first data object or the second data object to retrieve the at least one reporting value based at least in part on a determination from using the associations of the mapping file that, with respect to the at least one reporting location, the at least one reporting value should be retrieved from the first data object or the second data object; and
   storing the at least one reporting value in the object instance of the hybrid class to produce the hybrid runtime data object
   generating a report using the at least one reporting value in the hybrid runtime data object; and
   outputting the report.

2. The computing system of claim 1, wherein the maintaining the multiple sets of data objects respectively corresponding to the multiple entities and the multiple reporting locations comprises:
   maintaining a single set of data objects corresponding to the first entity and the multiple reporting locations;
   receiving data indicative of the second entity joining the first entity; and
   generating the multiple sets of data objects based at least in part on receipt of the data indicative of the second entity joining the first entity.

3. The computing system of claim 1, wherein the first entity comprises at least one of a host entity or a professional employer organization and the second entity comprises at least one of a client entity of the host entity or a client organization of the professional employer organization.

4. The computing system of claim 1, wherein the multiple reporting locations comprise at least one of multiple reporting jurisdictions, multiple taxation reporting locations, or multiple taxation reporting jurisdictions.

5. The computing system of claim 1, wherein the mapping file comprises at least one of an index, a list, a configuration file, or a look-up table that indicates, with respect to the at least one reporting location, whether the at least one reporting data field is associated with the first entity or the second entity.

6. The computing system of claim 1, wherein the computing system performs said executing the hybrid class to generate the hybrid runtime data object at a reporting runtime.

7. The computing system of claim 1, wherein the at least one reporting value comprises reporting account identification data of the first entity or the second entity, and wherein the reporting account identification data corresponds to the at least one reporting location.

8. The computing system of claim 1, wherein at least one of execution of the hybrid class, generation of the hybrid runtime data object, the determination from using the associations of the mapping file, or retrieval of the at least one reporting value from the first data object or the second data object based at least in part on the determination from using the associations prevents intermingling of data respectively corresponding to the first entity and the second entity.

9. A computer-implemented method to perform reporting across multiple entities without intermingling data of the multiple entities, the computer-implemented method comprising:
   maintaining, by a computing system comprising one or more processors, multiple sets of data objects respectively corresponding to multiple entities and multiple reporting locations, the multiple sets of data objects respectively comprising one or more values corresponding to one or more data fields;
   executing, by the computing system, a hybrid class to generate a hybrid runtime data object comprising location-specific reporting data corresponding to the multiple entities and the multiple reporting locations,
   wherein executing, by the computing system, the hybrid class to generate the hybrid runtime data object comprises:
      executing, by the computing system, the hybrid class to generate an object instance of the hybrid class;
      determining, by the computing system, with respect to at least one reporting location, using associations of a mapping file of the hybrid class whether to retrieve at least one reporting value of at least one reporting data field from a first data object corresponding to a first entity or from a second data object corresponding to a second entity, wherein the associations of the mapping file associate multiple reporting data fields with multiple reporting locations, and wherein the associations of the mapping file further associate the multiple reporting data fields and the multiple reporting locations with the first entity or the second entity;
      accessing, by the computing system, the first data object or the second data object to retrieve the at least one reporting value based at least in part on a determination from using the associations of the mapping file that, with respect to the at least one reporting location, the at least one reporting value should be retrieved from the first data object or the second data object; and
      storing, by the computing system, the at least one reporting value in the object instance of the hybrid class to produce the hybrid runtime data object
   generating, by the computing system, a report using the at least one reporting value in the hybrid runtime data object and
   outputting, by the computing system, the report.

10. The computer-implemented method of claim 9, wherein the maintaining, by the computing system comprising the one or more processors, the multiple sets of data objects respectively corresponding to the multiple entities and the multiple reporting locations comprises:
   maintaining, by the computing system, a single set of data objects corresponding to the first entity and the multiple reporting locations;
   receiving, by the computing system, data indicative of the second entity joining the first entity; and
   generating, by the computing system, the multiple sets of data objects based at least in part on receipt of the data indicative of the second entity joining the first entity.

11. The computer-implemented method of claim 9, wherein the first entity comprises at least one of a host entity or a professional employer organization and the second entity comprises at least one of a client entity of the host entity or a client organization of the professional employer organization, and wherein at least one of the multiple sets of data objects, the first data object, the second data object, or one or more third data objects respectively corresponding to one or more third entities are stored in a centralized database.

12. The computer-implemented method of claim 9, wherein the multiple reporting locations comprise at least one of multiple reporting jurisdictions, multiple taxation reporting locations, or multiple taxation reporting jurisdictions.

13. The computer-implemented method of claim 9, wherein the mapping file comprises at least one of an index, a list, a configuration file, or a look-up table that indicates, with respect to the at least one reporting location, whether the at least one reporting data field is associated with the first entity or the second entity.

14. The computer-implemented method of claim 9, wherein the at least one reporting value comprises at least one attribute of the first entity or the second entity.

15. The computer-implemented method of claim 9, wherein the at least one reporting value comprises reporting account identification data of the first entity or the second entity, and wherein the reporting account identification data corresponds to the at least one reporting location.

16. The computer-implemented method of claim 9, wherein at least one of execution of the hybrid class, generation of the hybrid runtime data object, the determination from using the associations of the mapping file, or retrieval of the at least one reporting value from the first data object or the second data object based at least in part on the determination from using the associations prevents intermingling of data respectively corresponding to the first entity and the second entity.

17. One or more tangible non-transitory computer-readable media storing computer-readable instructions that, when executed by one or more processors, cause the one or more processors to perform operations, the operations comprising:
   maintaining multiple sets of data objects respectively corresponding to multiple entities and multiple reporting locations, the multiple sets of data objects respectively comprising one or more values corresponding to one or more data fields;
   executing, at a reporting runtime, a hybrid class to generate a hybrid runtime data object comprising location-specific reporting data corresponding to the multiple entities and the multiple reporting locations,
   wherein executing, at the reporting runtime, the hybrid class to generate the hybrid runtime data object comprises:
      executing the hybrid class to generate an object instance of the hybrid class;

determining, with respect to at least one reporting location, using associations of a mapping file of the hybrid class whether to retrieve at least one reporting value of at least one reporting data field from a first data object corresponding to a first entity or from a second data object corresponding to a second entity, wherein the associations of the mapping file associate multiple reporting data fields with multiple reporting locations, and wherein the associations of the mapping file further associate the multiple reporting data fields and the multiple reporting locations with the first entity or the second entity;

accessing the first data object or the second data object to retrieve the at least one reporting value based at least in part on a determination from using the associations of the mapping file that, with respect to the at least one reporting location, the at least one reporting value should be retrieved from the first data object or the second data object; and storing the at least one reporting value in the object instance of the hybrid class to produce the hybrid runtime data object;

generating a report using the at least one reporting value in the hybrid runtime data object; and outputting the report.

18. The one or more tangible non-transitory computer-readable media of claim 17, wherein the maintaining the multiple sets of data objects respectively corresponding to the multiple entities and the multiple reporting locations comprises:

maintaining a single set of data objects corresponding to the first entity and the multiple reporting locations;

receiving data indicative of the second entity joining the first entity; and generating the multiple sets of data objects based at least in part on receipt of the data indicative of the second entity joining the first entity.

19. The one or more tangible non-transitory computer-readable media of claim 17, wherein the mapping file comprises at least one of an index, a list, a configuration file, or a look-up table that indicates, with respect to the at least one reporting location, whether the at least one reporting data field is associated with the first entity or the second entity, and wherein at least one of the multiple sets of data objects, the first data object, the second data object, or one or more third data objects respectively corresponding to one or more third entities are stored in a centralized database.

20. The one or more tangible non-transitory computer-readable media of claim 17, wherein the at least one reporting value comprises reporting account identification data of the first entity or the second entity, and wherein the reporting account identification data corresponds to the at least one reporting location.

* * * * *